United States Patent [19]

Uchida et al.

[11] Patent Number: 5,665,299

[45] Date of Patent: Sep. 9, 1997

[54] METHOD OF PRODUCING PATTERNED SHAPED ARTICLE

[75] Inventors: Hiroshi Uchida, Ashikaga; Mituhiro Onuki, Kiryu; Hideo Watanabe, Ashikaga, all of Japan

[73] Assignee: CCA Inc., Tokyo, Japan

[21] Appl. No.: 715,479

[22] Filed: Sep. 18, 1996

Related U.S. Application Data

[62] Division of Ser. No. 198,267, Feb. 18, 1994, Pat. No. 5,576,031.

[30] Foreign Application Priority Data

Feb. 19, 1993 [JP] Japan .................. 5-53139

[51] Int. Cl.$^6$ .......................... B29C 31/10; B29C 39/12
[52] U.S. Cl. ................ 264/510; 264/517; 264/101; 264/112
[58] Field of Search .................. 264/517, 101, 264/112, 113, 510, 516

[56] References Cited

U.S. PATENT DOCUMENTS

| | | | |
|---|---|---|---|
| 797,945 | 8/1905 | Dahl | 425/130 |
| 957,187 | 5/1910 | Chappell | 264/247 |
| 995,206 | 6/1911 | Wassermann | 425/130 |
| 1,137,595 | 4/1915 | Eyl | 264/247 |
| 1,539,148 | 5/1925 | Sylvester | 264/247 |
| 2,007,961 | 7/1935 | Bolton | 425/130 |
| 2,115,249 | 4/1938 | Bowman | 264/246 |
| 2,212,863 | 8/1940 | Hughes | 425/130 |
| 2,552,090 | 5/1951 | Eusner | 425/130 |
| 2,874,649 | 2/1959 | Pelletier | 426/249 |
| 3,296,675 | 1/1967 | Filangeri | 425/130 |
| 3,764,646 | 10/1973 | Hach | 264/246 |
| 4,100,304 | 7/1978 | Getman | 426/281 |
| 4,153,401 | 5/1979 | Longinotti | 425/130 |

FOREIGN PATENT DOCUMENTS

| | | |
|---|---|---|
| 0473383 | 3/1992 | European Pat. Off. . |
| 0558248 | 9/1993 | European Pat. Off. . |
| 0586257 | 3/1994 | European Pat. Off. . |
| 339321 | 6/1904 | France . |
| 68728 | 3/1892 | Germany . |
| 83307 | 1/1895 | Germany . |
| 2316481 | 10/1973 | Germany . |
| 2215266 | 9/1989 | United Kingdom . |

*Primary Examiner*—Mary Lynn Theisen
*Attorney, Agent, or Firm*—Oblon, Spivak, McClelland, Maier & Neustadt, P.C.

[57] ABSTRACT

A method of producing a patterned shaped article which includes the steps of placing on a base surface, a form made of at least one partition member defining the boundary of the patterned to be produced, a peripheral frame surrounding the partition member at a prescribed spacing therefrom and a cover closing the upper ends of the partition member and the peripheral frame. The method also includes the steps of supplying dry particles to a pattern space enclosed by the partition member and a pattern space between the partition member and the peripheral frame, removing the form from the base surface forming a particle course having a prescribed pattern and causing the particles to set into an integral mask.

11 Claims, 21 Drawing Sheets

FIG. 8
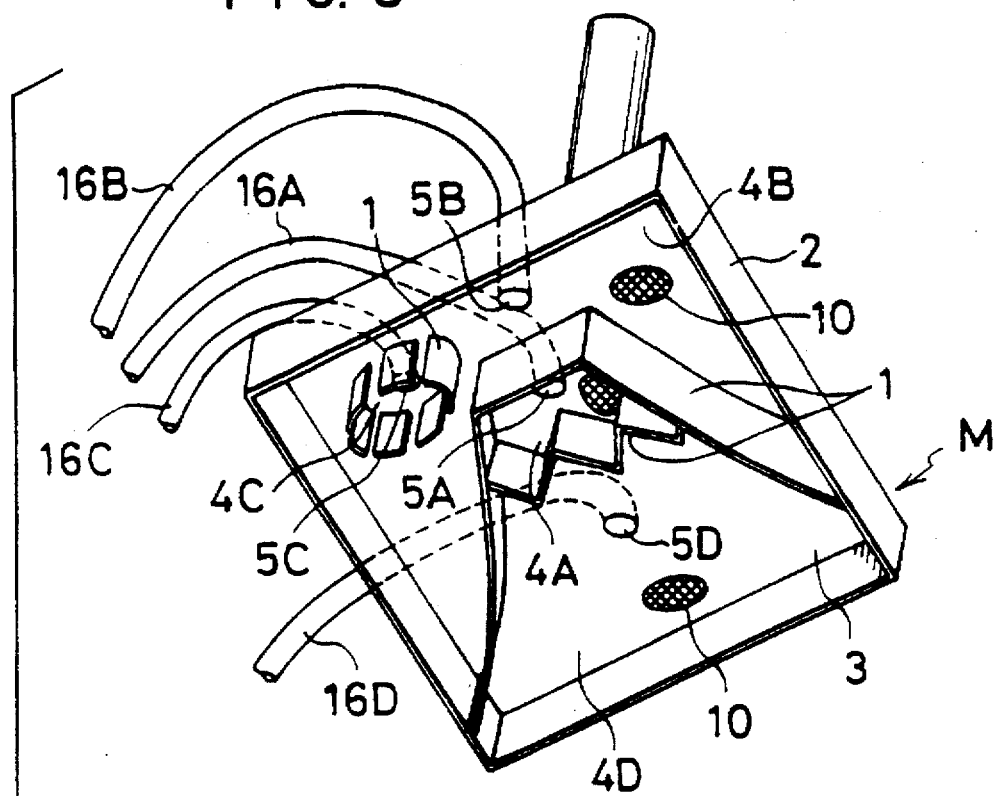
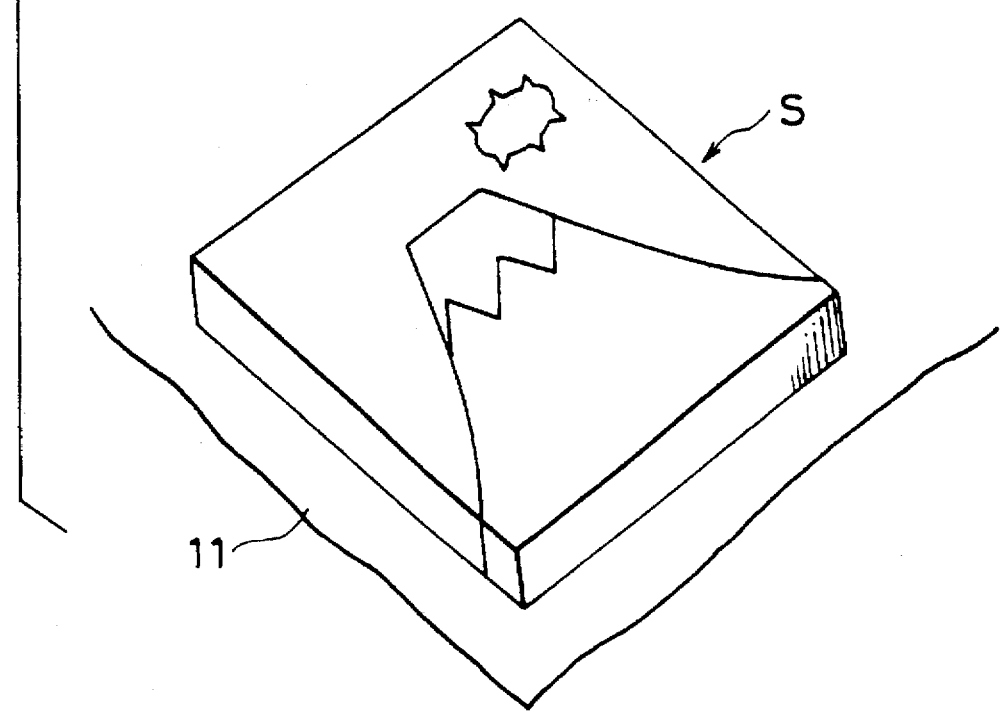

FIG. 15
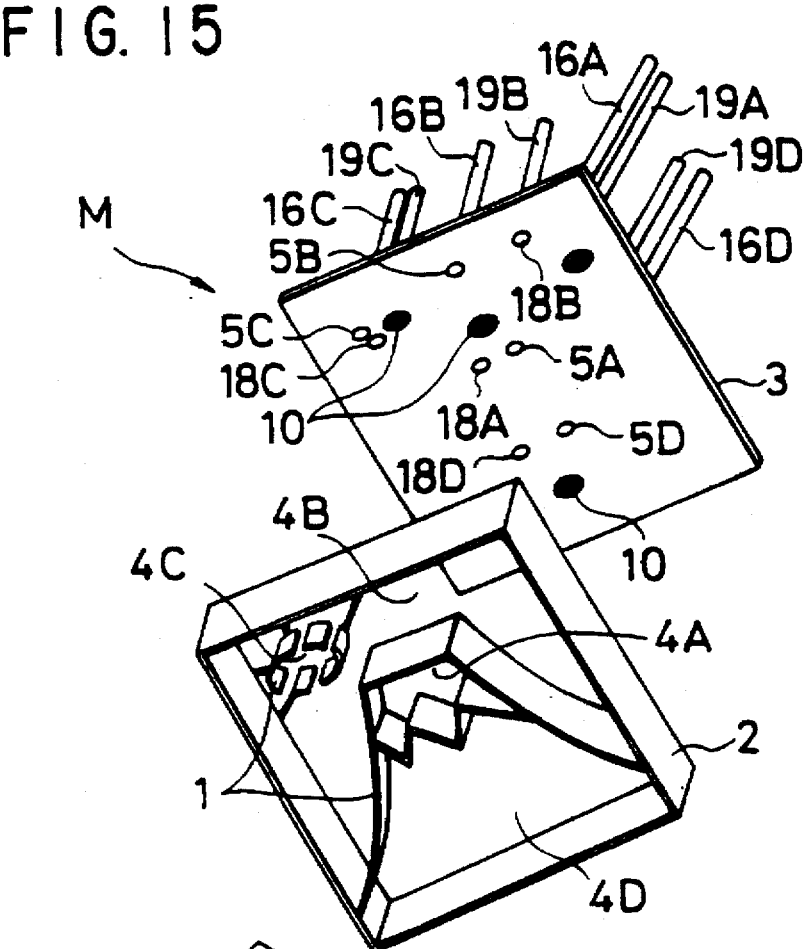
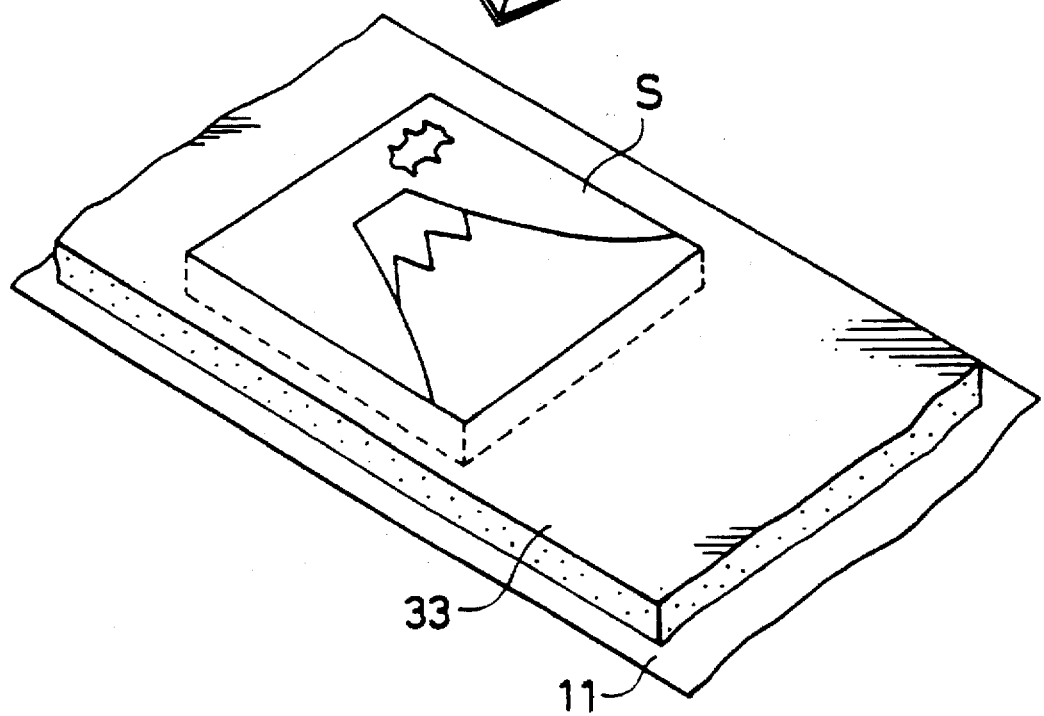

5,665,299

METHOD OF PRODUCING PATTERNED SHAPED ARTICLE

This is a division of application Ser. No. 08/198,267 filed on Feb. 18, 1994, now U.S. Pat. No. 5,576,031.

BACKGROUND OF THE INVENTION

1. Field of the Invention

This invention relates to a molding apparatus for producing patterned shaped articles from various types of particles and to a method for using the molding apparatus to produce patterned shaped articles such as patterned shaped concrete articles, patterned shaped artificial stone articles, raw products for sintering into patterned shaped ceramic articles, patterned shaped ceramic articles, shaped articles having impasto layers, shaped plastic articles, patterned shaped foodstuffs and the like.

The term "particles" used throughout this specification is defined to include particles, grains and granules, either alone or in combination with each other.

2. Description of the Prior Art

Up to now the only way available for providing a part of a surface, such as of paving blocks, with a pattern indicating a crosswalk, a stop sign or other such traffic control mark or for providing the entire surface of the blocks with a pattern has been to paint the surface with a coating material such as paint or to inlay the desired pattern.

Since the patterns painted on a part or all of the surface of paving blocks are exposed to abrasion from, for example, the shoes of pedestrians walking on the blocks and the tires of vehicles driving over them, they quickly wear off and have to be redone at frequent intervals. The amount of labor involved in this work is considerable. Where the pattern is formed by inlaying, the work itself is troublesome and very costly.

The present invention was accomplished in view of the foregoing circumstances and has as its object to provide an apparatus and a method for rapidly producing patterned shaped articles which do not lose their surface patterns and do not become unsightly even when exposed to surface abrasion.

SUMMARY OF THE INVENTION

For achieving the aforesaid object, the molding apparatus for patterned shaped articles according to the invention comprises a form constituted of at least one partition member defining the boundary of the pattern to be produced, a peripheral frame surrounding the partition member at a prescribed spacing therefrom and a cover for closing the upper ends of the partition member and the peripheral frame, at least one first feed port for supplying particles into a pattern space enclosed by the partition member, at least one second feed port for supplying particles into a pattern space between the partition member and the peripheral frame, and charging means connected with at least one of the first feed port and the second feed port for supplying particles to at least one of the pattern spaces by compressed air.

In a preferred aspect of the invention, the molding apparatus further comprises a form constituted by at least one partition member defining the boundary of the pattern to be produced, a peripheral frame surrounding the partition member at a prescribed spacing therefrom and a cover for closing the upper ends of the partition member and the peripheral frame, at least one first feed port for supplying particles into a pattern space enclosed by the partition member, at least one first suction port for sucking particles out of the pattern space enclosed by the partition member, at least one second feed port for supplying particles into a pattern space between the partition member and the peripheral frame, at least one second suction port for sucking particles out of the pattern space between the partition member and the peripheral frame, charging means connected with at least one of the first feed port and the second feed port for supplying particles to at least one of the pattern spaces by compressed air, and suction means connected with at least one of the first suction port and the second suction port for sucking particles from the pattern spaces.

In another preferred aspect of the invention, the molding apparatus further comprises a form constituted of a partition member defining the boundary of the pattern to be produced and a cover for closing the upper end of the partition member, a feed port for supplying particles into a pattern space enclosed by the partition member, a suction port for sucking particles out of the pattern space enclosed by the partition member, charging means connected with the feed port for supplying particles, and suction means connected the suction port for sucking particles from the pattern space.

The invention further provides a method of producing a pattern shaped article comprising the steps of placing on a base surface or a backing layer a form constituted of at least one partition member defining the boundary of the pattern to be produced, a peripheral frame surrounding the partition member at a prescribed spacing therefrom and a cover for closing the upper ends of the partition member and the peripheral frame, supplying dry particles to a pattern space enclosed by the partition member and a pattern space between the partition member and the peripheral frame, removing the form from the base surface or a backing layer, forming a particle course having a prescribed pattern, and causing the particles to set into an integral mass.

In a preferred aspect of the invention, the method comprises the steps of placing on a base surface or a backing layer a form constituted of a partition member defining the boundary of the pattern to be produced and a cover for closing the upper end of the partition member, supplying dry particles to a pattern space enclosed by the partition member, removing the form from the base surface or the backing layer, forming a particle course having a prescribed pattern, and causing the particles to set into an integral mass.

In another preferred aspect of the invention, the method comprises the steps of pressing open side down into an existing particle layer provided on a base surface a form constituted of at least one partition member defining the boundary of the pattern to be produced, a peripheral frame surrounding the partition member at a prescribed spacing therefrom and a cover for closing the upper ends of the partition member and the peripheral frame, sucking existing particle layer particles from at least one of a pattern space enclosed by the partition member and a pattern space between the partition member and the peripheral frame, supplying at least one pattern space from which existing particle layer particles were sucked with particles different from those of the existing particle layer, removing the form from the existing particle layer, forming a particle course having a prescribed pattern in the existing particle layer, and causing the supplied particles and the existing particle layer to set into an integral mass.

In still another preferred aspect of the invention, the method comprises the steps of pressing open side down into an existing particle layer provided on a base surface a form constituted of a partition member defining the boundary of the pattern to be produced and a cover for closing the upper end of the partition member, sucking existing particle layer particles from a pattern space enclosed by the partition member, supplying the pattern space from which existing particle layer particles were sucked with particles different from those of the existing particle layer, removing the form from the existing particle layer, forming a particle course having a prescribed pattern in the existing particle layer, and causing the supplied particles and the existing particle layer to set into an integral mass.

Since for the production of the shaped article the invention forms pattern spaces using a form including a partition member defining the pattern to be produced, it is able to produce shaped articles repeatedly at high speed. In addition, the use of compressed air for supplying the particles to the pattern spaces make it possible to form shaped particle articles almost instantaneously. Moreover, since the invention enables a patterned shaped article to be produced by pressing a form into an existing particle layer, locally removing the existing particles and then supplying other particles into the evacuated spaces, it enables ready production of shaped articles from a base material imparted with various patterns and added with different materials.

The above and other features of the present invention will become apparent from the following description made with reference to the drawings.

BRIEF DESCRIPTION OF THE DRAWINGS

FIG. 8 is a perspective view of a form for the molding apparatus of FIG. 7.

FIG. 15 is a perspective view of a form for the molding apparatus of FIG. 14.

DESCRIPTION OF THE PREFERRED EMBODIMENTS

Figure 1:
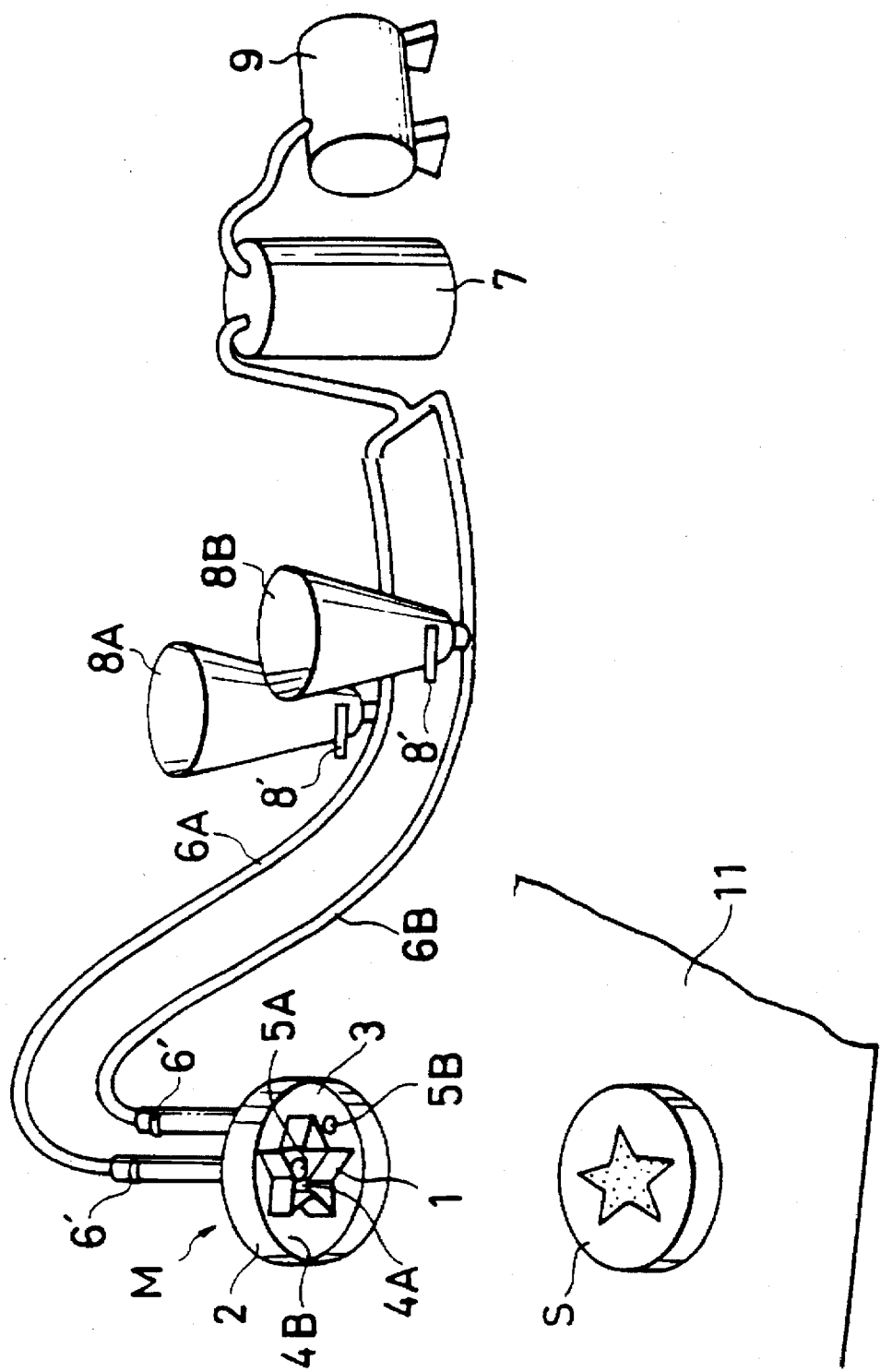
FIG. 1 is a schematic view for explaining a first embodiment of the apparatus for producing a shaped article (the molding apparatus) according to the invention.
Figure 2:
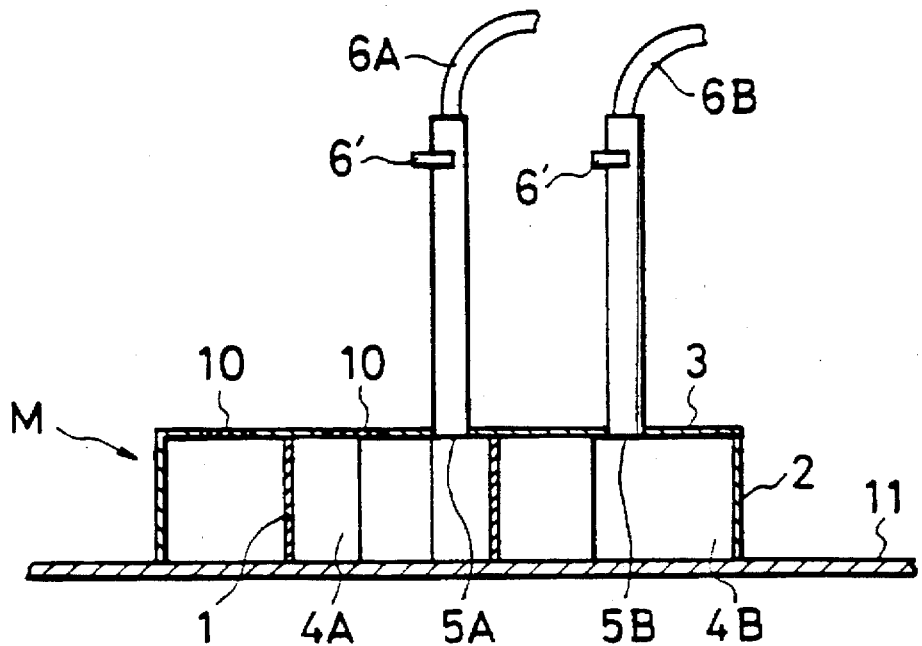
FIG. 2 is a sectional view of an example of a form for the molding apparatus of FIG. 1.

FIGS. 1 to 8 illustrate a first embodiment of the patterned shaped article molding apparatus according to the invention. It should be understood, however, that the molding apparatus according to this embodiment is not limited to the arrangements shown in the drawings but can also be constituted by various other configurations. The molding apparatus shown in FIGS. 1 and 2 is for producing a shaped article with a star pattern. It is equipped with a form M consisting of a continuous star-shaped partition member 1 whose height is equal to the thickness of the star pattern course to be formed, a peripheral frame 2 of the same height surrounding the partition member 1 and a cover 3 closing the upper ends of the partition member 1 and the peripheral frame 2. The form M has a feed port 5A for charging particles into a pattern space 4A inside the star-shaped partition member 1 and a feed port 5B for charging particles into a pattern space 4B between the peripheral frame 2 and the partition member 1. The feed ports 5A and 5B are connected with a compressed air storage tank 7 by supply pipes 6A and 6B. The portions of the supply pipes 6A and 6B connected with the form M are rigid and each is equipped with a manual gate 6'. The remaining portions of the supply pipes are made of hose or other flexible conduits and each has a particle tank (8A or 8B) connected to branch off from an intermediate point thereof. Each of the particle tanks 8A and 8B is equipped at its lower part, in the vicinity of the tank feed port, with an electric gate 8' ganged with the associated manual gate 6'. The compressed air storage tank 7 is connected with an air compressor 9 for supplying compressed air thereto. The portions of the cover 3 above the pattern spaces 4A and 4B are formed with vents 10 fitted with filters.

For producing shaped articles, the form M is moved by hand and, as shown in FIG. 2, is placed open side down on a base surface 11, which may be a sheet or the like. The gates 6' and 8' are then opened for allowing the compressed air to supply different colored particles to the pattern space 4A and the pattern space 4B. When both pattern spaces have been evenly and completely charged, the gates are closed. Next, the form M is lifted off the base surface 11, leaving thereon a shaped article S having a star pattern and a surrounding background pattern both formed of particle courses of prescribed thickness. The final shaped article is obtained by causing the particle courses to set into an integral mass by a method to be described later.

It is also possible to form the shaped article S on an existing backing layer of prescribed thickness formed on the base surface 11 beforehand and then cause it to set with the backing layer or to form a backing layer on top of the shaped article S and cause it to set together therewith.

Figure 3:
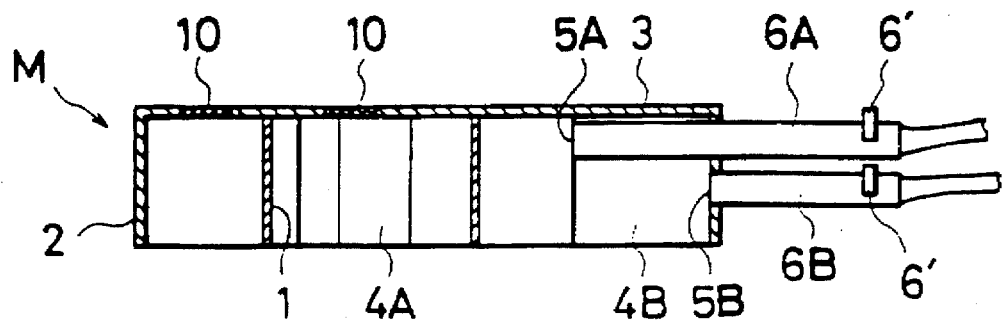
FIG. 3 is a sectional view of another example of a form for the molding apparatus of FIG, 1.

In the arrangement shown in FIGS. 1 and 2, the feed ports 5A and 5B are provided in the cover 3 and the supply pipes 6A and 6B are provided to stand upright on the cover. As shown in FIG. 3, however, it is possible instead to provide the particle feed ports and supply pipes in the partition member 1 and the peripheral frame 2. Moreover, the height of the partition member 1 and the peripheral frame 2 do not necessarily have to be the same and it suffices if the bottom edge of one or the other of the partition member and the peripheral frame is able to make tight contact with the base surface 11. (In the interest of brevity, no explanation will be given with regard to the electrical system, the devices for driving the electric gates etc.)

Figure 4:
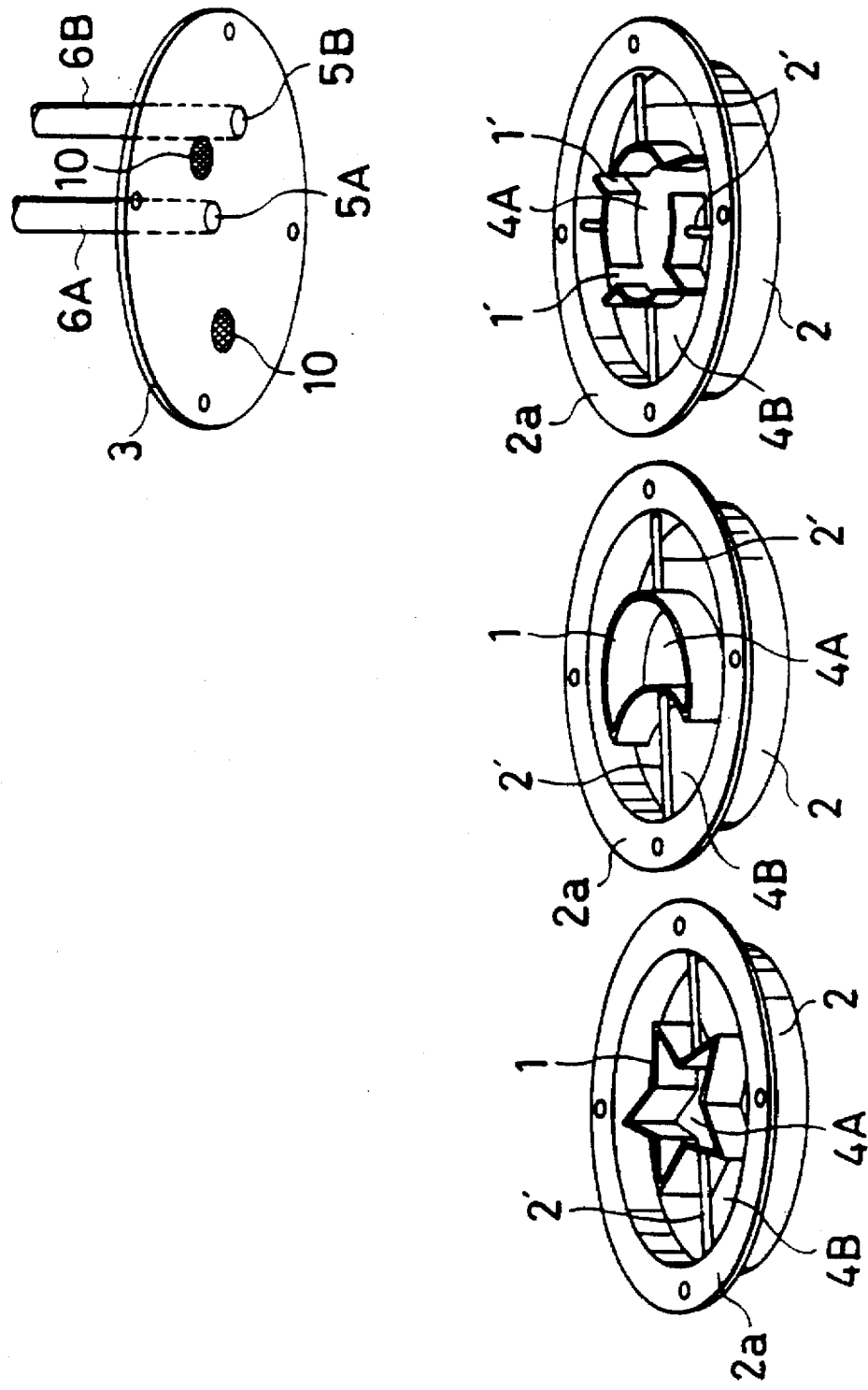
FIG. 4 is a perspective view of still further examples of forms for the molding apparatus of FIG. 1.

As shown in FIG. 4, it is also possible to fasten the partition member 1 and the peripheral frame 2 of the form M together with stays 2' and make the cover 3 attachable/detachable with respect to the form M. With this arrangement, different forms M can be configured by selectively attaching the cover 3 to peripheral frames 2 attached with differently shaped partition members 1, such as the star, moon and sun shaped partition members 1 shown in FIG. 4. This makes it possible to form shaped articles with various patterns to a desired thickness on the base surface 11. In the case illustrated in FIG. 4, the attachment between the cover 3 and the peripheral frame 2 is achieved by providing the upper edge of the peripheral frame 2 with a collar 2a, placing the cover 3 so that its periphery registers with the periphery of the collar 2a, and fastening the cover 3 and the peripheral frame 2 together with nuts and bolts. The configuration for achieving the attachable/detachable relationship between the cover 3 and the peripheral frame 2 is not limited to this, however, and it is possible to use magnetic attachment or various other means instead. In any case, for ensuring a tight seal with the upper edges of the partition member i and the peripheral frame 2, it is preferable to attach or coat the undersurface of the cover 3 with a sheet of rubber, sponge, any of various types of rubbery plastic or the like. Further, instead of providing the vents 10, it is possible to attach an air permeable mat of unwoven material or the like to the underside of the cover so as to make contact with the partition member and the peripheral frame so that the portion of the mat caught between the cover and the upper edges of the partition member and the peripheral frame serves both as a filter and as a vent.

As can be seen in FIG. 4, the star and moon shaped partition members 1 are continuous while the sun shaped partition member 1 has discontinuous portions 1'. When particles are supplied to the pattern space 4A defined by the partition member 1 having the discontinuous portions 1' before they are supplied to the surrounding pattern space 4B, they blow out into the pattern space 4B through the discontinuous portions 1'. This makes it possible to represent sun flares, fuzzy cloud edges and the like.

Figure 5:
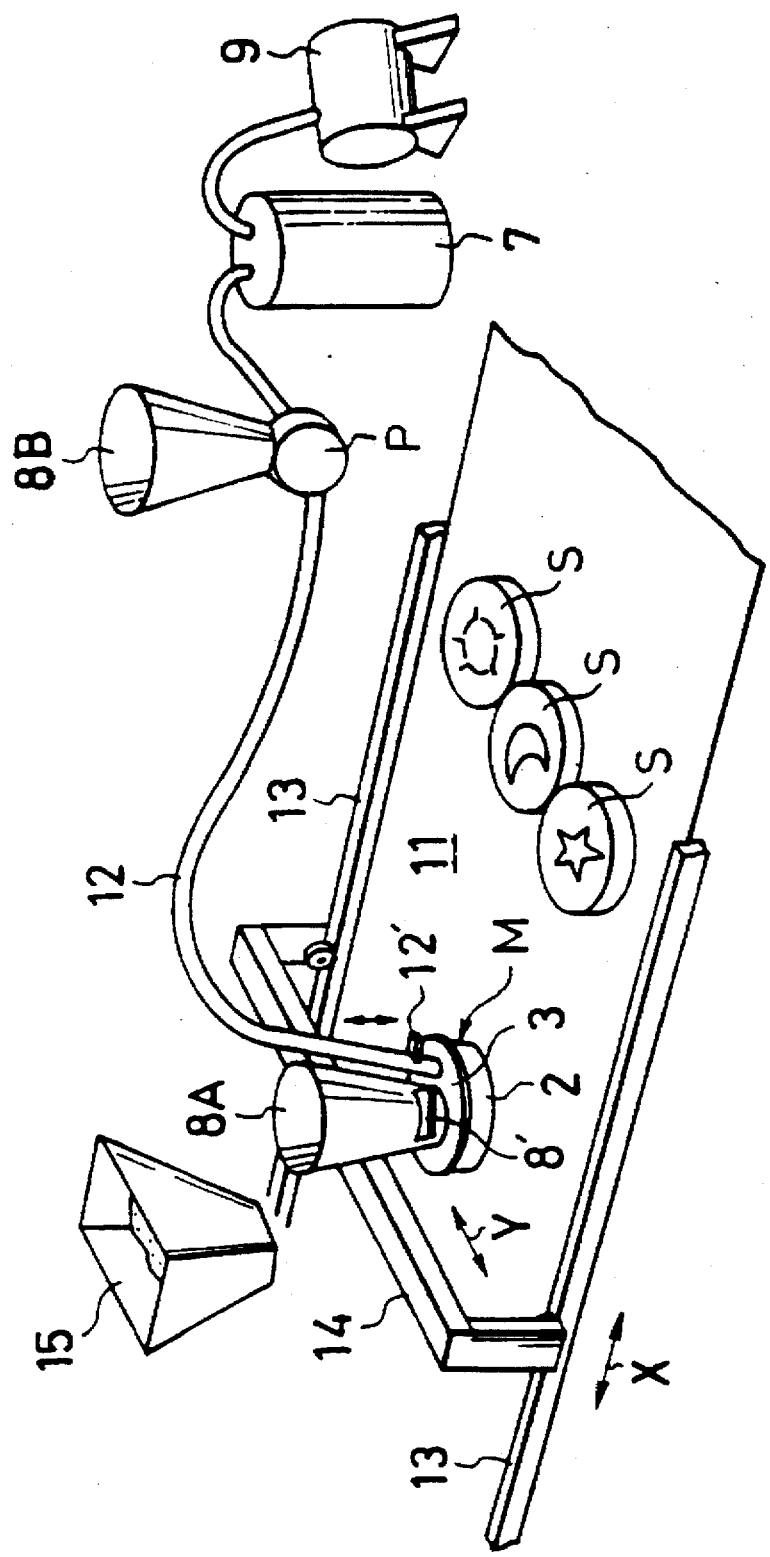
FIG. 5 is a schematic view for explaining a modified version of the first embodiment of the molding
Figure 6:
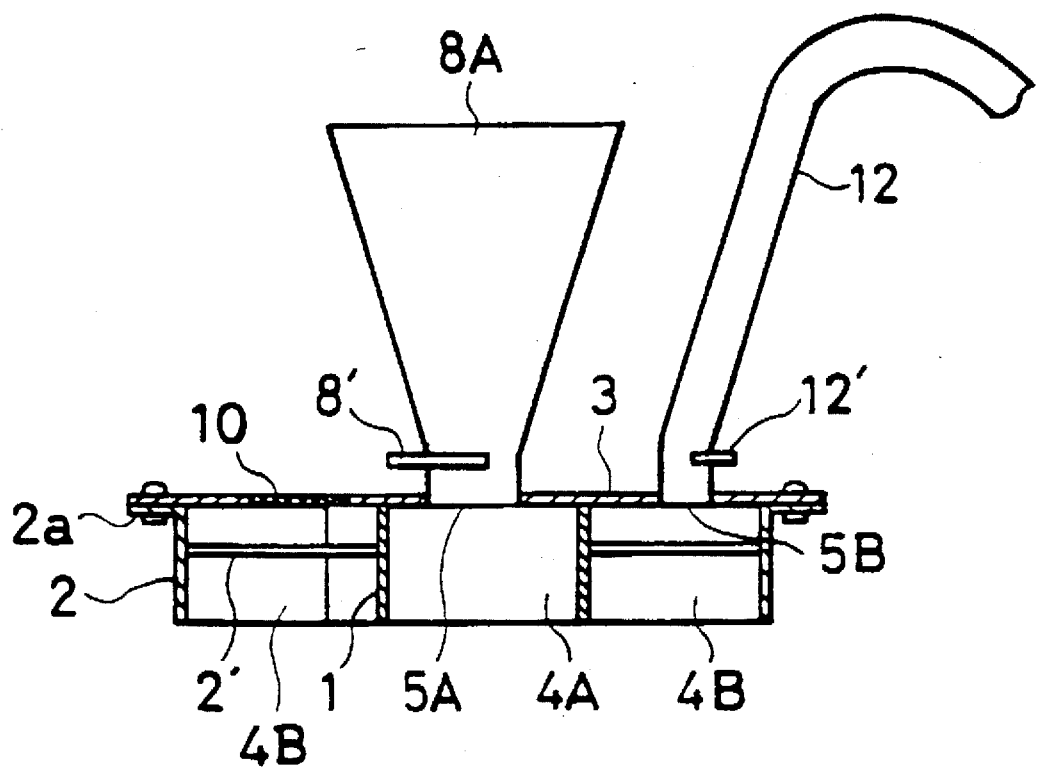
FIG. 6 is a sectional view of a form for the molding apparatus of FIG. 5.

FIGS. 5 and 6 show a modified version of the first embodiment of the molding apparatus shown in FIG. 1. Similarly to the case illustrated in FIG. 4, the partition member 1 and the peripheral frame 2 of the form M are fastened together by stays 2' and the cover 3 is made so as to be detachable from the form M. A particle tank 8A equipped with an electric gate 8' is mounted directly on the cover 3 to communicate with the feed port 5A thereof for feeding particles to the pattern space 4A defined by the partition member 1. One end of a supply pipe 12 is connected with the feed port 5B provided in the cover 3 for supplying particles to the pattern space 4B. The same end of the supply pipe 12 is equipped with an electric gate 12', while the other end thereof is connected with a pump P installed at the lower end of the particle tank 8B. The pump P is operated in unison with the opening/closing operation of the electric gate 12' and is supplied with compressed air from a compressed air storage tank 7 supplied with compressed air by an air compressor 9.

The particle tank 8A fastened on the cover 3 is mounted to be movable to the left and right (Y direction) with respect to a bridgelike frame 14 movable fore and aft (X direction) along rails 13 and also to be vertically movable. The particle tank 8A can thus be positioned as desired within the limits of the XY system. At one end of its movement in the X direction it is supplied with particles from a large particle tank 15. In addition, it is able to attach/detach the cover from the integrated partition and peripheral frame unit. The particle tank 8B, pump P, compressed air storage tank 7, and air compressor 9 are disposed outside of the rails 13.

With this arrangement a form can be constituted in either of two ways. In one, the partition-and-peripheral frame unit is separated from the cover 3 and placed on the base surface 11 (a sheet or the like) on which the pattern is to be formed and the cover and the particle tank supported on the XY frame is lowered onto the unit so that the cover closes the pattern spaces 4A and 4B from the top. In the other, the unit is attached to the underside of the cover and the resulting form is placed on the base surface 11 at the position where the pattern is to be formed. Then, in either case, the electric gate 8' is opened for directly supplying particles from the particle tank 8A into the pattern space 4A, while the pattern space 4B is evenly and completely charged with particles supplied at high density by the pump P and the compressed air. The electric gates 8' and 12' are then closed and the form is removed from the base surface, leaving thereon a patterned shaped article S consisting of particle courses of prescribed thickness. Various final shaped articles can thus be obtained by causing the particle courses to set into an integral mass by a method to be described later. (in the interest of brevity, no explanation will be given with regard to the form attachment/detachment mechanism, the drive mechanisms for the gates and the bridgelike frame, etc.)

Further, by conducting the aforesaid operations using differently configured partition members such as the star, moon and sun shaped members shown in FIG. 4 it is possible to produce shaped articles S with the various patterns shown in FIG. 5.

In this case, partition member 1 and the peripheral frame 2 are separately removed from the base surface after the feeding of the particles has been completed. (For enabling the particle tank 8A to feed particles to the pattern space 4A without using compressed air it suffices to provide the vent 10 with respect to only the pattern space 4B.)

Figure 7:
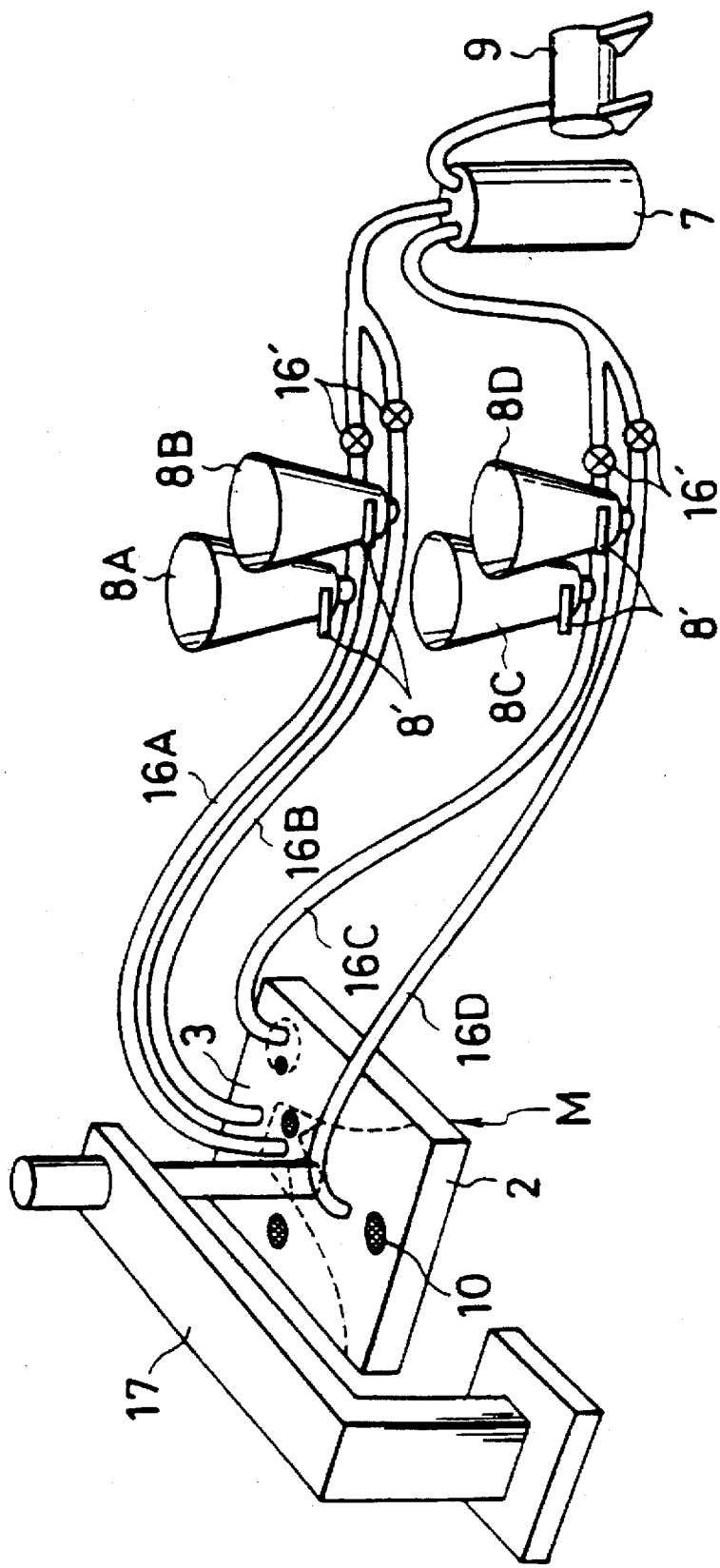
FIG. 7 is a schematic view for explaining a another modified version of the first embodiment of the molding apparatus.

FIGS. 7 and 8 show another modified version of the first embodiment of the molding apparatus shown in FIG. 1. The form M in this case is for forming a shaped article S depicting the scene shown in FIG. 8. It consists of partition members 1, a rectangular peripheral frame 2 of the same height as the partition members 1 and a cover 3, all formed integrally as one body. The cover 3 is provided with four feed ports 5A, 5B, 5C and 5D for feeding particles to the four pattern spaces 4A, 4B, 4C and 4D defined by the partition members and the peripheral frame. The feed ports are connected with a compressed air storage tank 7 by supply pipes 16A, 16B, 16C and 16D. The supply pipes are equipped at intermediate points thereof with electric valves 16' and in the vicinity of the electric valves 16' with particle tanks 8A, 8B, 8C and 8D that branch off therefrom. Each of the particle tanks is equipped with an electric gate. The compressed air storage tank 7 is supplied with compressed air by an air compressor 9. The form M constituted of the partition members, peripheral frame and cover is supported on a vertically movable arm 17 for lowering it onto and removing it from the base surface. The partition members representing the mountain and its snow cap are continuous members while the partition member representing the cloud is a discontinuous one of the type described earlier. The cover 3 is provided with vents 10, each fitted with a filter, at positions associated with the feed ports.

For producing shaped articles, the form M constituted of the integrally formed partition members, peripheral frame and cover is placed open side down on the reference surface and the electric gates 8' of the respective particle tanks are opened for allowing the compressed air to supply different color particles to the pattern spaces 4A–4D. When all of the pattern spaces have been evenly and completely charged, the gates are closed. Next, the form is lifted off the base surface 11, leaving thereon a shaped article S having a scene pattern including a brown mountain, white snow, a white cloud and a blue sky all formed of particle courses of prescribed thickness. The final shaped article can be obtained by causing the particle courses to set into an integral mass. (In the interest of brevity, no explanation will be given with regard to the drive mechanisms for the gates, valves, arm, etc.)

Figure 9:
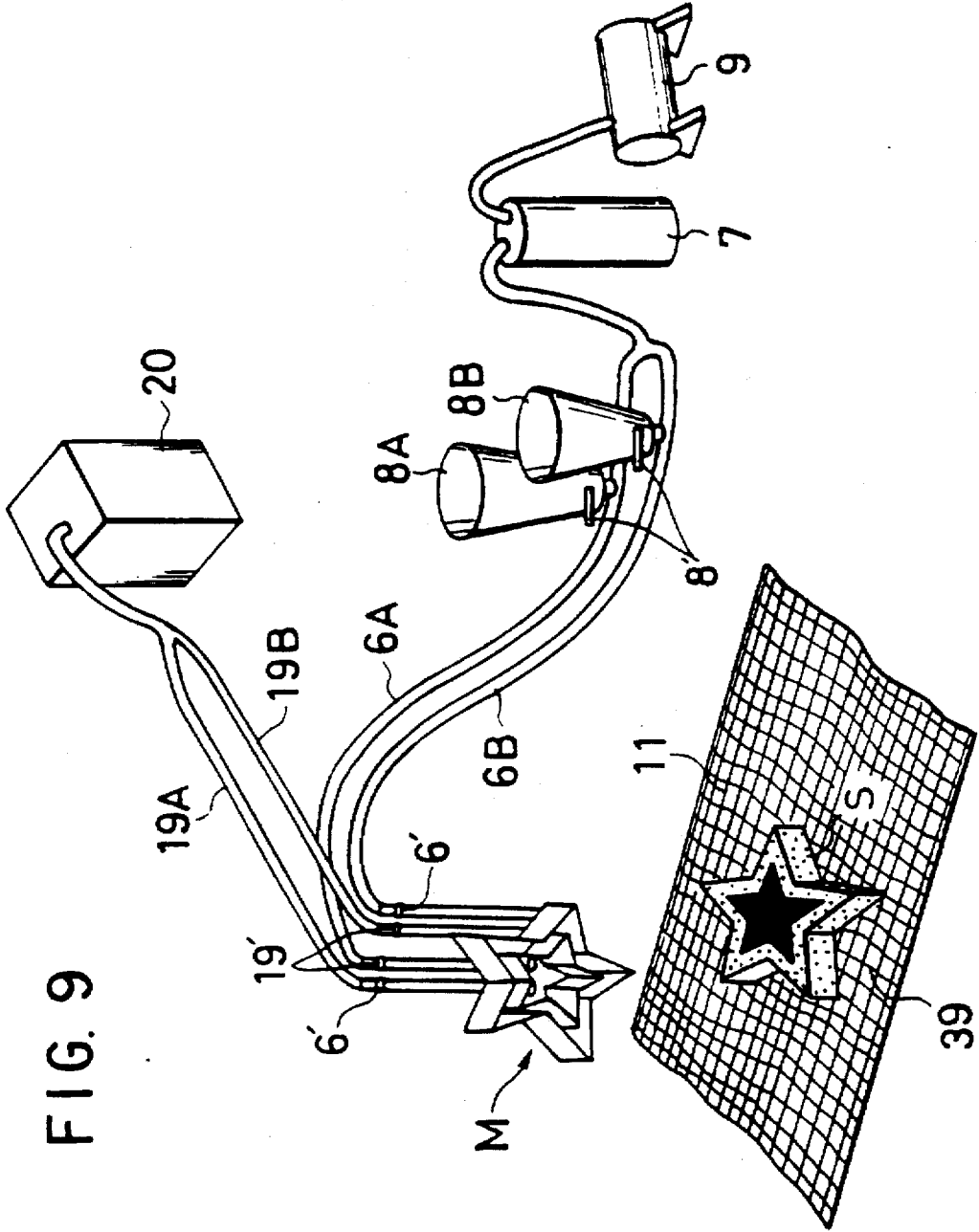
FIG. 9 is a schematic view for explaining second embodiment of the apparatus for producing a shaped article according to the invention.
Figure 10:
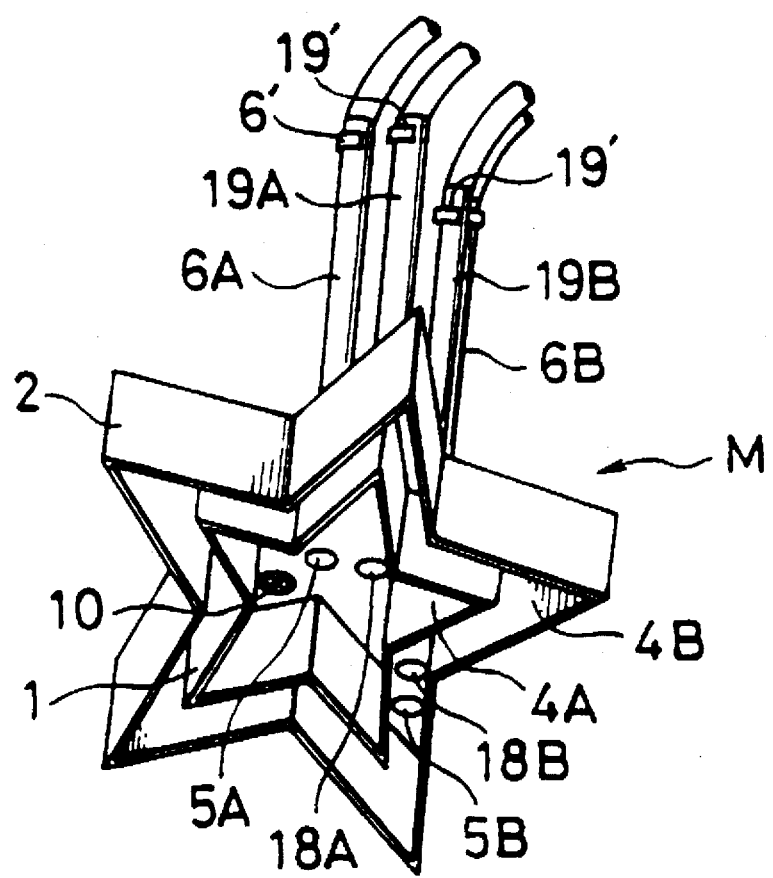
FIG. 10 is a perspective view of a form for the molding apparatus of FIG. 9.

FIGS. 9–15 illustrate a second embodiment of the patterned shaped article molding apparatus according to the invention. It should be understood, however, that the molding apparatus according to this embodiment is not limited to the arrangements shown in the drawings but can also be constituted in various other configurations. The molding apparatus shown in FIGS. 9 and 10 is for producing a shaped article with a star pattern. It is equipped with a form M consisting of a continuous star-shaped partition member 1 whose height is equal to the thickness of the star pattern course to be formed, a somewhat larger star-shaped peripheral frame 2 of the same height surrounding the partition member 1 at a prescribed spacing therefrom and a cover 3 that integrally connects the partition member 1 and the peripheral frame 2 and closes the upper ends of the partition member 1 and the peripheral frame 2. The form M has a feed port 5A for feeding particles to a pattern space 4A inside the star-shaped partition member 1, a suction port 18A for sucking particles out of the pattern space 4A, a feed port 5B for feeding particles to a pattern space 4B between the peripheral frame and the partition member, and a suction port 18B for sucking particles out of the pattern space 4B. The two feed ports 5A and 5B are connected with an air tank 7 by supply pipes 6A and 6D. The portions of the supply pipes 6A and 6B connected with the form M are rigid and each is equipped with a manual gate 6'. The remaining portions of the supply pipes are made of hose or other flexible conduits and each has a particle tank (8A or 8B) connected to branch off from an intermediate point thereof. Each of the particle tanks 8A and 8B is equipped at its lower part, in the vicinity of the tank feed port, with an electric gate 8' ganged with the associated manual gate 6'. The air tank 7 is connected with an air compressor 9 for supplying compressed air thereto. The suction ports 18A and 18B are connected with an aspirator 20 by suction pipes 19A and 19B. The cover 3 is provided with vents 10, each fitted with a filter, at positions facing the pattern spaces 4A and 4B.

For producing shaped articles, the form M having the partition member 1, the peripheral frame 2, the cover 3, the feed ports 5A and 5B and the suction ports 18A and 18B is picked up by hand and placed open side down on the sheet or other base surface 11. The gates 6' and 8' are opened for allowing the compressed air to supply different color particles to the pattern spaces 4A and 4B. When the pattern spaces have been evenly and completely charged, the gates are closed. Next, the form is lifted off the base surface 11, leaving thereon a star shaped article S formed of particle courses of prescribed thickness and having the star pattern shown in FIG. 9. Various final shaped articles consisting of a large star with a smaller star of a different color inside can thus be obtained by causing the particle courses to set into an integral mass by an appropriate method. (In the interest of brevity, no explanation will be given with regard to the electrical system, the devices for driving the electric gates, etc.)

Figure 11:
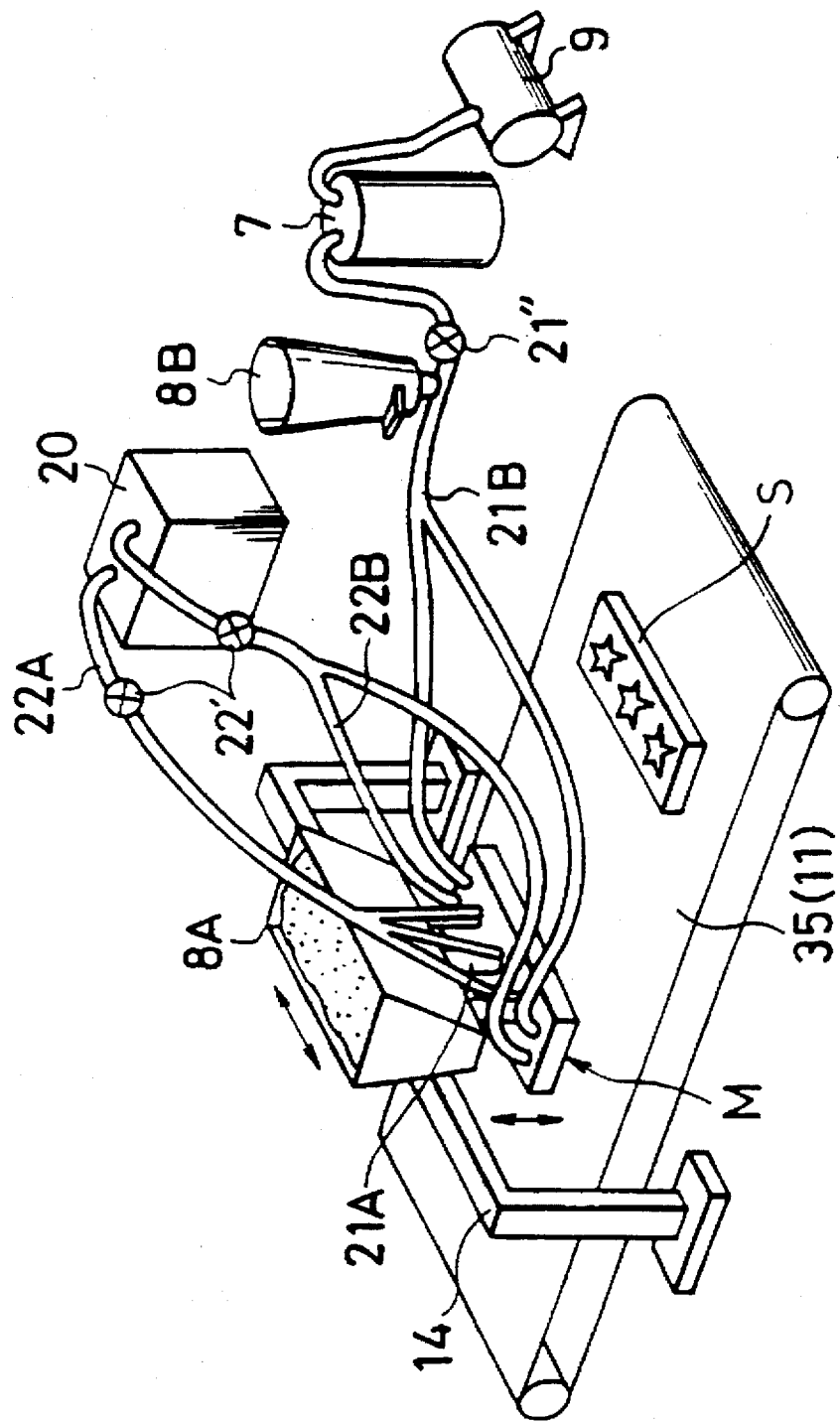
FIG. 11 is a schematic view for explaining a modified version of the second embodiment of the molding apparatus.
Figure 12:
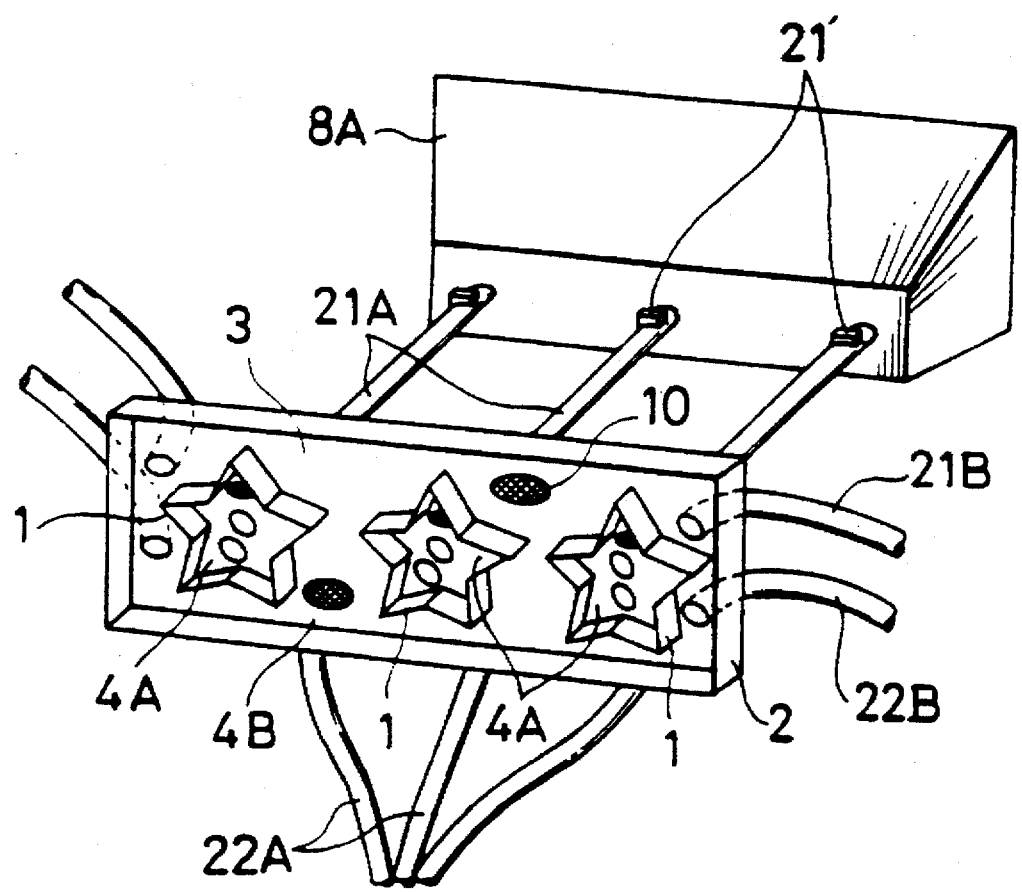
FIG. 12 is a perspective view of a form for the molding apparatus of FIG. 11.

FIGS. 11 and 12 show a modified version of the second embodiment of the molding apparatus shown in FIG. 9. The form M in this case is constituted of three star-shaped partition members 1, a rectangular peripheral frame 2 surrounding the partitions members 1 at a prescribed spacing therefrom and a cover 3 that integrally connects the partition members 1 and the peripheral frame 2. The form M is connected with three supply pipes 21A, each equipped with an electric gate 21', for supplying particles to pattern spaces 4A inside the star-shaped partition members 1, three suction pipes 22A for sucking particles out of the pattern spaces 4A, two supply pipes 21B for feeding particles to a pattern space 4B between the peripheral frame and the partition member, and two suction pipes 22B for sucking particles out of the pattern space 4B. The three supply pipes 21A with the electric gates 21' used for supplying particles to the pattern spaces 4A are extensible and are connected with a particle tank 8A located above the form M. The supply pipes 21B for the pattern spaces 4B are connected with an air tank 7, have an electric gate 21" at an intermediate point thereof and have a particle tank 8B connected to branch off therefrom in the vicinity of the electric gate 21". The air tank 7 is connected with an air compressor 9 for supplying compressed air thereto. The suction pipes 22A and 22B are connected with an aspirator 20. The form M constituted of the partition members, the peripheral frame and the cover and connected with the supply and suction pipes is supported to be laterally movable along on a bridgelike frame 14 together with the particle tank 8A. The cover is able to move vertically in the space below the particle tank 8A and the bridgelike frame 14 straddles a belt conveyor 35 which serves as the base surface 11. The cover 3 is provided with a vent 10 fitted with a filter at a position above the pattern space 4B.

For producing shaped articles, the form M is placed open side down on the base surface 11. The electric gates 21' are opened for directly supplying particles from the particle tank 8A into the three pattern spaces 4A, while the pattern space 4B is evenly and completely charged with particles of a different color supplied by compressed air. The gates are then closed and the form is removed from the base surface, leaving thereon a shaped article S consisting of particle courses of prescribed thickness and having a pattern consisting of three enclosed stars as shown in FIG. 11. The final shaped article can be obtained by causing the particle courses to set into an integral mass. (In the interest of brevity, no explanation will be given with regard to the mechanisms etc. for driving the gates and the belt conveyor and for moving the form laterally and vertically.)

When the partition members 1 have an irregular periphery as in the foregoing embodiment, it is preferable to provide auxiliary flow regulating plates on the cover, for example, as well as to provide the vent(s) 10 with consideration to the flow of the particles from the feed ports, and/or to increase the number of feed ports as required.

Figure 13:
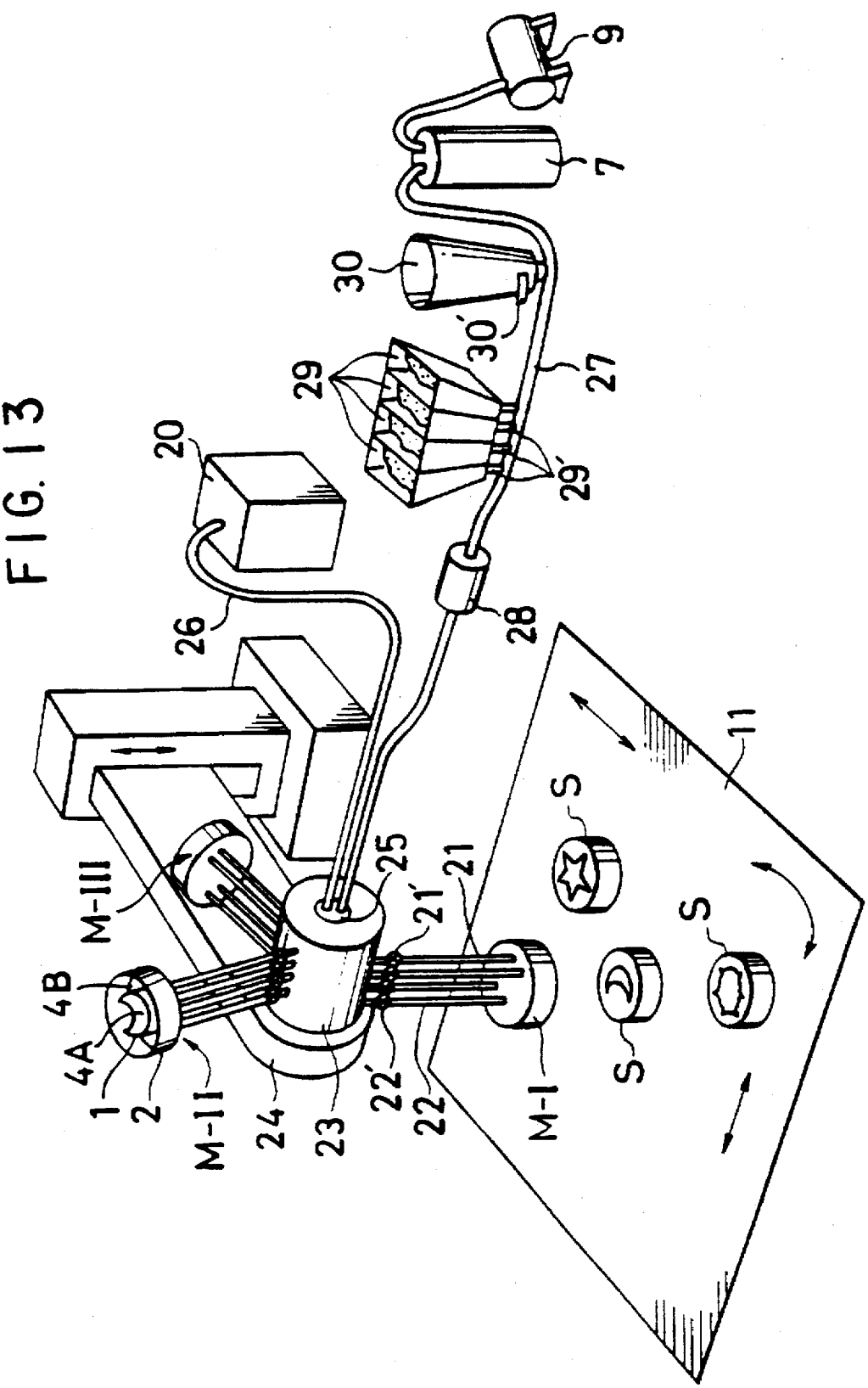
FIG. 13 is a schematic view for explaining a another modified version of the second embodiment of the molding apparatus.

FIG. 13 shows another modified version of the second embodiment of the molding apparatus shown in FIG. 9. Three different types of forms M-I, M-II and M-III whose partition members 1 are, for example, formed in the manner shown in FIG. 4 to be star, moon and sun shaped are supported at 120° intervals about a rotor 23 whose axis of rotation lies horizontal. The rotor 23 is rotatably supported on a horizontal arm 24 adapted to be moved vertically by a motor or the like. It is adapted to be intermittently rotated in 120° steps by a one-turn motor or the like.

In this molding apparatus, the rotor 23 is rotated until the one of the forms M-I, M-II and M-III corresponding to the pattern of the shaped article to be produced, for example the form M-II, is directed straight down to face the base surface 11 from above. The horizontal arm 24 is then lowered to place the form M-II on the base surface 11, whereafter compressed air is used to supply different color particles to the pattern space 4A inside the partition member and the pattern space 4B between the partition member 1 and the peripheral frame 2. As a result, form M-II forms a shaped article S with a moon pattern on the base surface.

For enabling different color particles to be selectively supplied to the pattern spaces 4A and 4B of each of the forms and enabling particles contained in these pattern spaces to be sucked out, one end of a supply pipe 21A and one end of a suction pipe 22A are connected with the pattern space 4A of each form and one end of a supply pipe 21B and one end of a suction pipe 22B are connected with the pattern space 4B of each form. The rotor 23 rotates about a stationary center shaft 25 and a switching sleeve is inserted between the center shaft 25 and the rotor 23 to rotate together with the rotor 23. The other ends of the pairs of supply pipes 21A, 21B and the pairs of suction pipes 22A, 22B are connected about the switching sleeve at 120° intervals. A main suction pipe 26 from an aspirator 20 and a main supply pipe 27 from an air tank 7 are connected to the end face of the center shaft 25. The main supply pipe 27 passes through a line mixer 28 and is connected with a coloring material tank 29 equipped with electric gates 29' and containing discrete supplies of four different basic particle coloring materials (black, red, blue and yellow) and upstream of the coloring material tank 29 with a particle tank 30 equipped with an electric gate 30'. The air tank 7 is connected with an air compressor 9 for supplying compressed air thereto. The covers of the forms are provided with vents, each fitted with a filter, at positions facing the pattern spaces 4A and 4B. The lower edges of the partition members and the peripheral frames are made of rubber or other such material capable of tight contact with the base surface 11.

The outer surface of the center shaft 25 of the rotor 23 is provided with two valve ports for communicating the main supply pipe 27 with the pattern spaces 4A and 4B of the forms and with two valve ports for communicating the main suction pipe 26 with the pattern spaces 4A and 4b of the forms. The switching sleeve rotates about the center shaft 25 as one body with the rotor 23 such that when one of the forms, for example the form M-II, faces straight down only the supply pipes 21A and 21B and the suction pipes 22A and 22B of the form M-II communicate with the center shaft 25 valve ports and that when another of the forms, for example form M-I (or M-III) faces straight down only the supply pipes 21A and 21B and the suction pipes 22A and 22B of the form M-I (or M-III) communicate with the valve ports. For enabling the respective pipes to be opened and closed, the supply pipes 21A and 21B of each form are equipped with electric gates 21' and the suction pipes 22A and 22B thereof are equipped with electric gates 22'.

For producing shaped articles, the rotor 23 is rotated to direct one of the forms straight down, whereafter the horizontal arm 24 is lowered to bring the open side of the form against the base surface 11. The supply gates 21', 30' and 29' are then opened for allowing the compressed air to evenly and completely charge the pattern spaces 4A and 4B with particles, either as they are or as different color particles obtained by mixing with coloring material. The gates are then closed and the form is removed from the base surface, leaving thereon a shaped article S consisting of particle courses of prescribed thickness and having a star, moon, sun or other desired pattern. (In the interest of brevity, no explanation will be given with regard to the mechanisms etc. for driving the arm, gates, valves and the like.)

Figure 14:
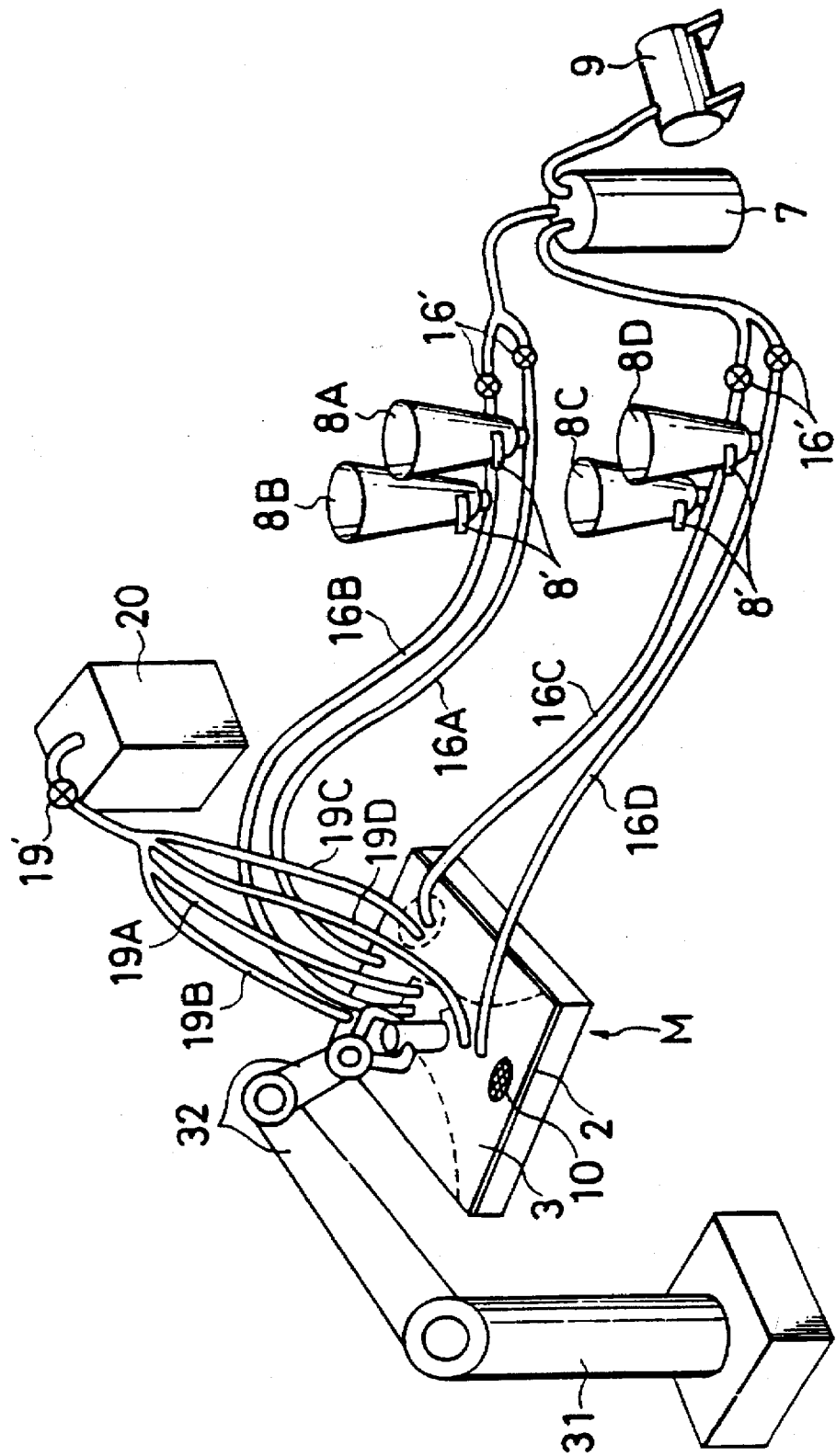
FIG. 14 is a schematic view for explaining a another modified version of the second embodiment of the molding apparatus.

FIGS. 14 and 15 show another modified version of the second embodiment of the molding apparatus shown in FIG. 9. The form M in this case is for producing a scene pattern and consists of a peripheral frame 2, partition members 1 fixed to the peripheral frame 2 and a detachable cover 3. Similarly to the case of FIG. 7, four pattern spaces 4A, 4B, 4C and 4D are formed between the partition member 1 and the peripheral frame 2. The cover 3 is provided with four feed ports 5A, 5B, 5C and 5D for supplying particles to the four pattern spaces and with four suction ports 18A, 18B, 18C and 18D for sucking particles out of the spaces. The feed ports are connected with an air tank 7 by supply pipes 16A, 16B, 16C and 16D. The supply pipes are equipped at intermediate points thereof with electric valves 16' and have particle tanks 8A, 8B, 8C and 8D connected to branch off therefrom in the vicinity of the valves. The air tank 7 is connected with an air compressor 9 for supplying compressed air thereto. The suction ports are connected with an aspirator 20 by suction pipes 19A, 19B, 19C and 19D and an electric gate 19' is provided in a common section of the suction pipes near the aspirator 20. The form M consisting of the partition members 1, the peripheral frame 2, the cover 3, the feed ports 5A–5D and the suction ports 18A–18D is supported on an arm 32 of a robot 31 by which it is placed on and removed from the base surface 11. The partition members representing the mountain and its snow cap are continuous members while the partition member representing the cloud is discontinuous. The cover 3 is provided with vents 10, each fitted with a filter, at positions corresponding to the pattern spaces.

For producing shaped articles, the form M is placed on the reference surface and the feed gates 8' and 16' are opened for allowing the compressed air to supply different color particles to the pattern spaces 4A–4D. When all of the pattern spaces have been evenly and completely charged, the gates are closed. As a result, there is obtained a shaped article S formed of a particle course 33 of prescribed thickness and having a pattern similar to that in FIG. 8. (In the interest of brevity, no explanation will be given with regard to the attachment/detachment mechanism, the drive mechanisms for the valves, gates and robot, etc.)

Figure 16:
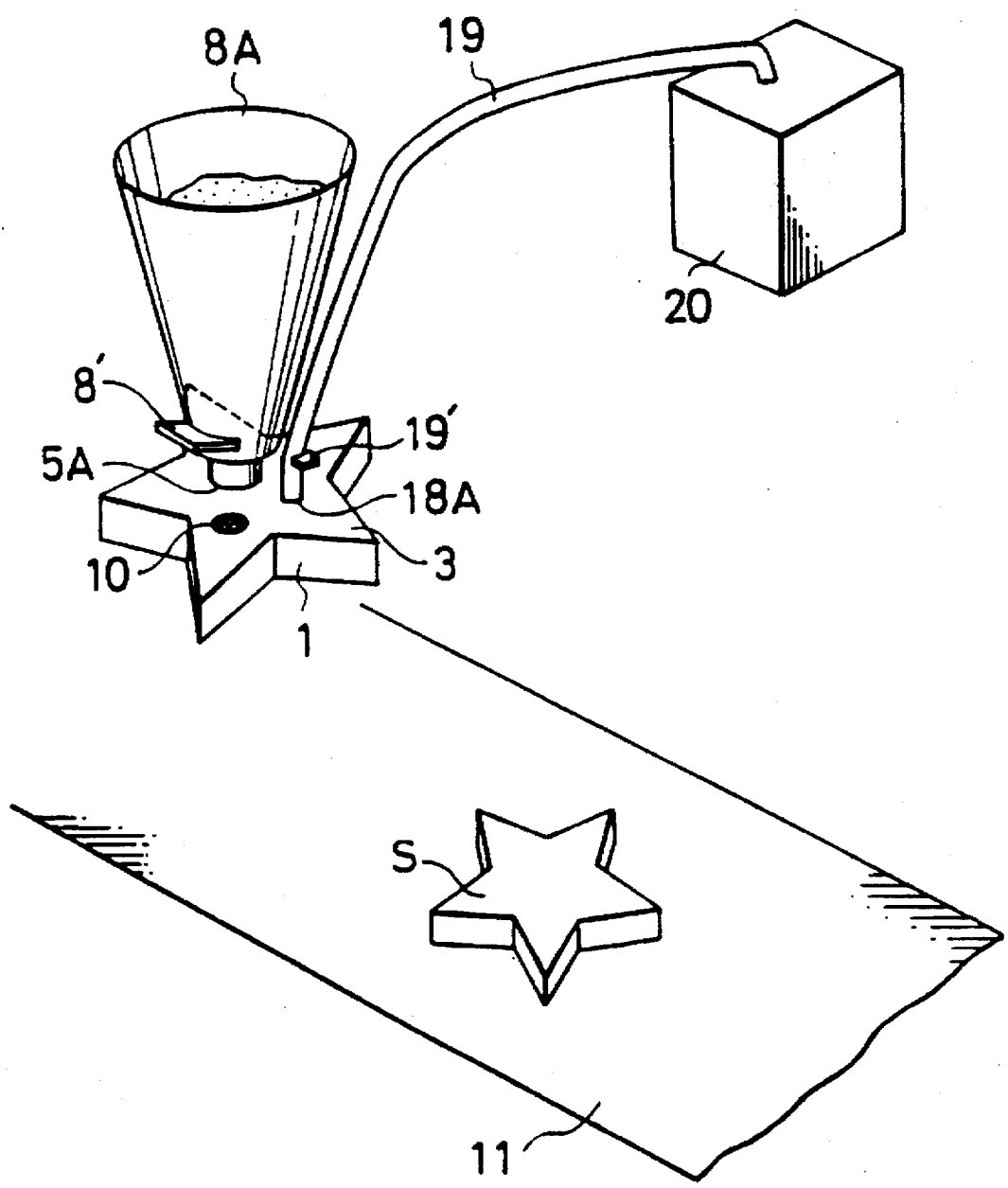
FIG. 16 is a schematic view for explaining a third embodiment of the apparatus for producing a shaped article according to the invention.
Figure 17:
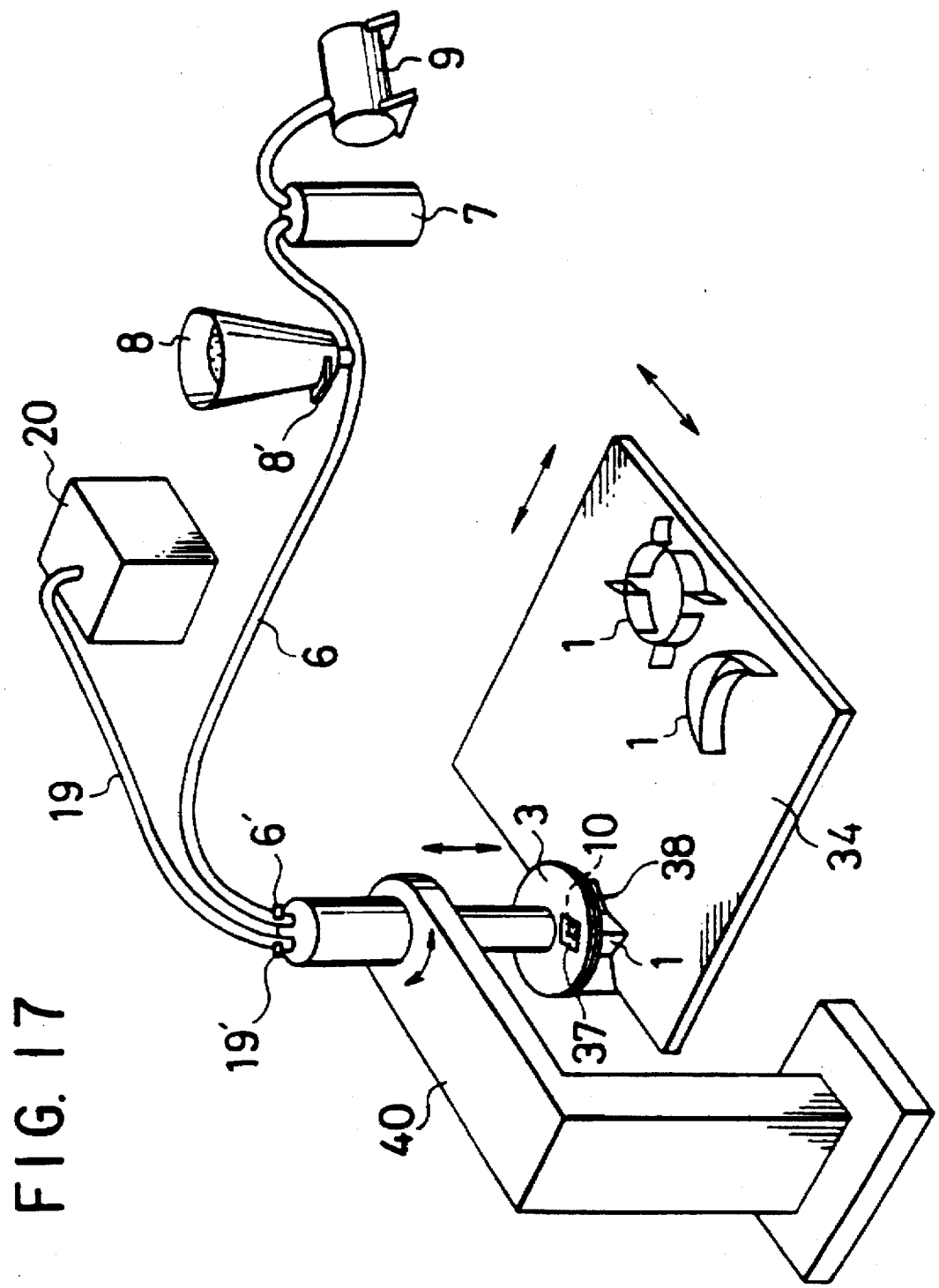
FIG. 17 is a schematic view for explaining a modified version of the third embodiment of the molding apparatus.
Figure 18:
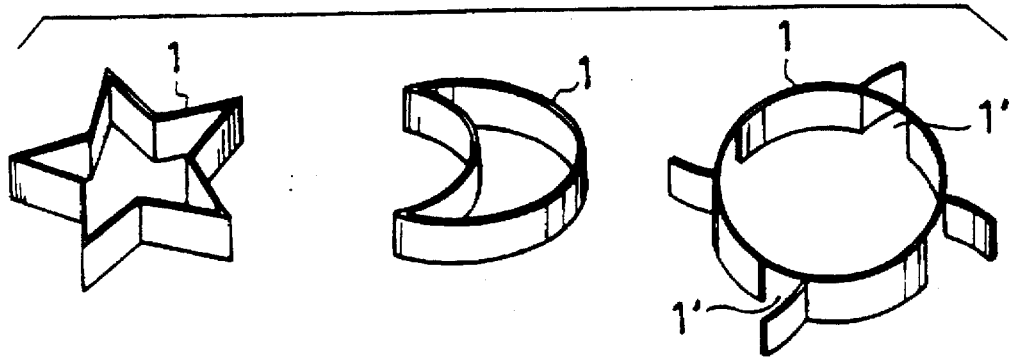
FIG. 18 is schematic view showing three types of partition members used in the molding apparatus of FIG. 17.

FIGS. 16–18 illustrate a third embodiment of the patterned shaped article molding apparatus according to the invention. It should be understood, however, that the molding apparatus according to this embodiment is not limited to the arrangements shown in the drawings but can also be constitutes in various other configurations. The molding apparatus shown in FIG. 16 is for producing a shaped article with a star pattern. It is equipped with a form M consisting of a continuous star-shaped partition member 1 whose height is equal to the thickness of the star pattern course to be formed, a cover 3 formed integrally with and closing the upper end of the partition member 1, a feed port 5A formed in the cover 3 for feeding particles to a pattern space 4A inside the star-shaped partition member 1, and a suction port 1ea formed in the cover 3 for sucking particles out of the pattern space 4A. A particle tank 8 is attached to the cover in direct connection with the feed port via a manual gate 8', the suction port 18A is connected to an aspirator 20 by a suction pipe 19A, and the suction pipe 19A is provided with a manual gate 19' in the vicinity of the suction port. The cover 3 is provided with a vent 10 fitted with a filter.

The form M having the partition member, the cover, the feed port and the suction port is picked up by hand together with the particle tank and the form is placed open side down on a sheet or other such base surface 11. The manual gate 8' is then opened to allow particles from the particle tank 8 to fill the pattern space. Finally, the form is removed, leaving a star-shaped article S on the base surface.

When the molding apparatus is used in this manner, it is preferable to incline the sides of the partition member in accordance with the angle of repose of the particles.

In another mode of operation, the form M is placed open side down on an existing particle course formed in advance. It is then pressed into the particle course with the electric gate 19' open so that the particles inside the form are sucked out as the form progresses into the course when the pattern space has been emptied of particles, the manual gate 8' is opened for feeding in particles from the particle tank 8. When the form is removed, there is obtained a star-shaped article S embedded in the particle course.

FIGS. 17 and 18 show a modified version of the third embodiment of the molding apparatus shown in FIG. 16. In this case, the form M used has a cover 3 that is detachable from the partition member 1, making it possible to attach to the undersurface of the cover a partition member selected from among star, moon, sun and other patterns, similarly to what was explained earlier with reference to FIG. 4. The cover 3 is provided with a feed port for supplying particles to the interior of the partition member and a suction port for sucking particles from inside the partition member. The feed port is connected with an air tank 7 by a supply pipe 6 equipped in the vicinity of the feed port with an electric gate 6' and has a particle tank 8 connected to branch off from intermediate point thereof. The air tank 7 is connected with an air compressor 9 for supplying compressed air thereto. The suction port is connected to an aspirator by a suction pipe 19 equipped in the vicinity of the suction port with an electric gate 19'. The cover 3 is provided with a vent 10 fitted with a filter and having a regulator check valve 37 for regulating the flow of air during intake and exhaust. The mating areas of the cover undersurface and the partition member are made of rubber 38 or same other material able to ensure tight contact.

The form M having the partition member, the feed port and the suction port is fixed on an arm 40 positioned over an XY table 34 so as to be rotatable and vertically movable. A sheet or the like is spread over the base surface constituted by the upper surface of the XY table and the form M is placed open side down on the sheet. The supply gates 6' and 8' are then opened for allowing the compressed air to supply particles to the interior of the partition member. When the interior of the partition member has been evenly and completely charged with particles, the gates are closed. Next, the form is lifted off the base surface, leaving thereon an article S formed of particle course of prescribed thickness and having a star or other pattern according to the pattern of the partition member used.

If found necessary, the sides of the partition member can again be inclined in accordance with the angle of repose of the particles. However, since use of a continuous partition member makes it possible to compact the particles by increasing the air pressure, in the configuration according to FIG. 17 the degree of inclination need only be as large as required for removal of the form. In another mode of operation, the form M is placed open side down on an existing particle course formed in advance. It is then pressed into the particle course with the gate 19' of the suction port open so that the particles inside the form are sucked out as the form progresses into the course. When the pattern space has been emptied of particles, the gate 6' and 8' are opened for feeding in particles from the particle tank 8. When the form is removed, there is obtained a star-shaped article S embedded in the particle course.

Other partition members 1 can be kept at one end of the XY table 34 and moved into position for interchangeable use by moving the table. (In the interest of brevity, no explanation will be given with regard to the mechanisms etc. for driving the gates and the table and for moving the form vertically.)

While various mechanisms can be used for attaching and detaching the cover and the partition member, it is preferable to form the partition member of steel and use a magnetic force or the like for its positioning and removal. This arrangement also facilitate automation. (In the interest of brevity, no explanation will be given with regard to the attachment/detachment mechanism, vibrator, the devices for driving the gates and arm, or the like.)

After formation, the shaped article S can be set as it is or can be overlaid with a backing layer and set therewith.

Although a number of embodiments were explained in the foregoing, the invention is not limited to the configurations described. For example, the partition member 1 and the peripheral frame 2 are not limited to star, moon and sun configurations and can have various other shapes depending on the pattern to be produced. The partition member 1 can be continuous or discontinuous and if discontinuous can utilize variously shaped elements such as pins, small pieces, wavy pieces and spiral pieces. Moreover, as shown in FIGS. 11 and 12, partition members representing a plurality of patterns can be used simultaneously for imparting a multiplicity of patterns to a single article. The peripheral frame need not necessarily be continuous. Insofar as no problem arises in producing the desired pattern, it can be slitted and discontinuous. It suffices to determine the heights of the partition member and the peripheral frame with reference to the thickness of the finished pattern. They need not necessarily be the same height. All that is required is that the lower edge of one of them is able to make tight contact with the base surface. Whether the bottom edge of the partition member or that of the peripheral frame is to make tight contact with the base surface can be decided as appropriate for the pattern to be produced.

For facilitating the removal of the form and preventing pattern disintegration by crumbling, the peripheral frame, in the case of a form with both a partition member and a peripheral frame, or the partition member, in the case of a form with only a partition member, can be imparted with an inclination in accordance with the angle of repose of the particles.

In the case where at least one of the partition member and the peripheral frame is made detachable from the cover, the decision as to which is to be made detachable can be made with consideration to the shaped article to be produced. Where it contributes to productivity, the entire form can be made detachable.

As materials for the partition member, the peripheral frame and the cover there can be used metals, ceramics, plastics, rubber, wood, woven fabric, unwoven fabric or the like. For establishing sharply defined pattern spaces, it is preferable to interpose a material capable of maintaining tight contact between the base surface and lower edges of the partition member and the peripheral frame and between the upper edges of partition member and the peripheral frame and the underside of the cover. Moreover the partition member and the peripheral frame can be formed partly or completely of an elastic material such as plastic, rubber, synthetic rubber or the like. This is advantageous since the elasticity of the material facilitates vertical positioning at the time these members come in contact with the base surface and also ensures the establishment of sharply defined pattern spaces. An air or liquid permeable base surface 39 can be established by using an air or liquid permeable material such as unwoven fabric, woven fabric or paper for the base surface. This is preferable because it enhances the tightness of contact, helps prevent dislocation of the vents and filters, promotes the formation of a strong and uniform shaped article, and, as a result of these effects, helps to keep the material supplied between the partition member and the peripheral frame from losing its shape.

During the supply of particles, the filter fitted in the vent 10 acts as an exhaust filter to prevent scattering of particles to the exterior, while during suction, it acts as an intake filter. It can be provided on the cover, the peripheral frame or the base surface to which the particles are supplied and the best location is determined with consideration to the productivity of the apparatus and the pattern to be formed. From the points of view of cleaning and handling it is advantageous to fit the filter in a vent provided in the cover. As the material for the filter there can be used unwoven fabric, woven fabric, paper, cotton or the like. The filter is preferably made detachable so that it can be changed if clogging occurs. The cover is best attached with a vibrator for filter cleaning. When a suction port is provided, the filter can be cleaned by applying suction when the pattern space is empty. It is preferable to fit the upper portion or the outside of the vent with a check valve 37 that has a large opening during feeding and a small opening during suction. This is advantageous in that during particle supply air can be exhausted at a high rate, which increases the speed with which the pattern spaces can be charged with particles, while during suction the suction and removal of particles proceeds more smoothly.

The feed port(s) and suction port(s) can be provided in the cover or, as shown in FIG. 3, directly in the partition member or the peripheral frame. For the convenience of explanation, the foregoing embodiments were explained as having the minimum number of feed ports and suction ports required for forming the pattern. If the individual pattern spaces have large areas or if the partition member is irregularly shaped, however, the vents should be provided with consideration to the flow of particles from the feed port or the suction ports and the number of feed ports and suction ports should be increased as required. Further, when the individual pattern spaces have large areas or the partition member is irregularly shaped, auxiliary flow regulating plates should preferably be provided as required on the cover etc.

The supply of particles can be achieved more evenly if the particles are supplied under a pulsating delivery force or the form is vibrated. When the partition member or the peripheral frame is extracted from a particles course, a neat extraction can be realized by vibrating the form during the removal. Equipping the cover with a vibrator makes it possible to supply the particles more evenly, to achieve neater removal of the partition member and the peripheral frame, and to clean the filter(s) more easily. If required, other members can also be equipped with vibrators.

The base surface may be constituted by a sheet, conveyor belt, plate or anything else on which it is possible to place the form. It can be the bottom plate of a double action press or the like, a frame having a floor and mounted on a belt conveyor, or an endless surface such as a belt conveyor. In addition, the particle course can be placed on a board, sheet or the like serving as the base surface, as it is or after being inverted.

The means for opening and closing the gates and valves can be of the manual, electric, pneumatic or hydraulic type. The types used and their mounting positions can be decided in consideration of the required supply and suction removal functions. The means for attaching and detaching the cover to and from the peripheral frame and the partition member can be of the magnetic, adhesive, clamping, screw, insertion or hook type. The compressed air can be used either as it is or in combination with a pump or other such device. When it is used in combination with a pump, the compressed air can be supplied to the delivery side, intake side or the interior of the pulp, which is preferable in consideration of air exhaust, friction and the like because the air can be delivered at high density, the total amount of air required is small and the particles can be supplied slowly. All embodiments of the molding apparatus can further be equipped with various auxiliary devices such as vibrators, static erasers and the like.

Varying the height and shape of the form and controlling the amount of particles supplied makes it possible to change the thickness of the particle course as desired, while varying the partition member makes it possible to shift between continuous sharp lines and diffused (blurred) lines. This, in conjunction with particle supply and suction control and the use of a continuous color blender, enables the formation of a wide range of complex and sophisticated patterns. The overall configuration of the apparatus is not limited to the examples shown in FIGS. 1–18. For example, in addition to the articulated robot 31 shown in FIG. 15 it also possible to use various other positioning means including, for example, a parallel translation positioning device, a cartesian coordinates positioning device, a cartesian coordinates robot, a cylindrical coordinates robot or a polar coordinates robot. It is further possible to use a robot in combination with a computer for using a plurality of forms for forming composite patterns and improving productivity. It is also possible to equip the apparatus with a plurality of forms, as shown in FIG. 13, for example. In addition, the apparatus can be combined with particle course formation means such a squeegee type course forming apparatus or with a sliding supply tank that supplies particles while sliding over the form, a supply tank with a slitted nozzle, a rotary feeder, a device employing an endless honeycomb belt or the like or an endless pile belt or the like. Such means can be used for charging and backing of the remaining portions or, particularly when combined with the third embodiment, for laying the particle layer formed in advance. Further, increased speed can be achieved by use of pressure feeding, and since pipes can be used, the space requirements are reduced. Thus the invention can be advantageously combined with existing facilities involving speed and space problems to realize various types of shaped article production apparatuses, at low cost and with short production start-up times.

Figure 19:
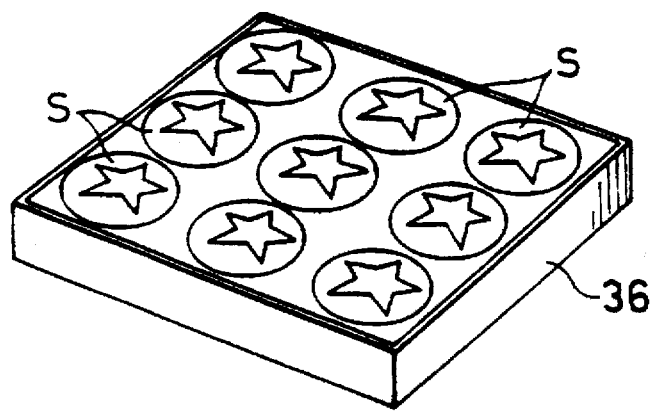
FIG. 19 is a perspective view of a first example of a shaped article produced by the invention.

For using the molding apparatus according to the first embodiment to produce the shaped article shown in FIG. 19, the form M of the apparatus shown in FIGS. 1 and 2 is picked up by hand and placed open side down on the floor (base surface) of the frame 36 and the gates 6' and 8' are opened to supply yellow particles into the pattern space 4A inside the partition member and supply white particles to the pattern space 4B between the partition member 1 and the peripheral frame 2. The form is then removed to leave on the base surface 11 a shaped article formed of particles to have a yellow star pattern against a white background. After the forgoing operations have been repeated, say, nine times, the remaining portions of the base surface are supplied with white particles manually or by some other method. For example, if the supply of particles to the remaining areas is conducted using the apparatus shown in FIGS. 1 and 2 without modification, the gate of the supply pipe 6A for supplying yellow particles is closed and only white particles are supplied to the remaining space in the frame from the supply pipe 6B. When this is completed, a backing layer is overlaid, if necessary, and the particles are allowed to set into an integral mass. Any mark left by removal of the partition member is cleanly eliminated by cave-in of the particles. In the case of using the apparatus shown in FIGS. 4 and 5, the star-shaped partition member is used and either the form is operated on the XY frame as in the case of the apparatus of FIG. 6 or a partition member and a separate peripheral frame are placed on the base surface in advance and a cover carried on the XY frame is then tightly attached to the partition member and the peripheral frame. Yellow particles are then supplied to the pattern space 4A inside the partition member and white particles are supplied to the pattern space 4B between the partition member and the peripheral frame.

Figure 20:
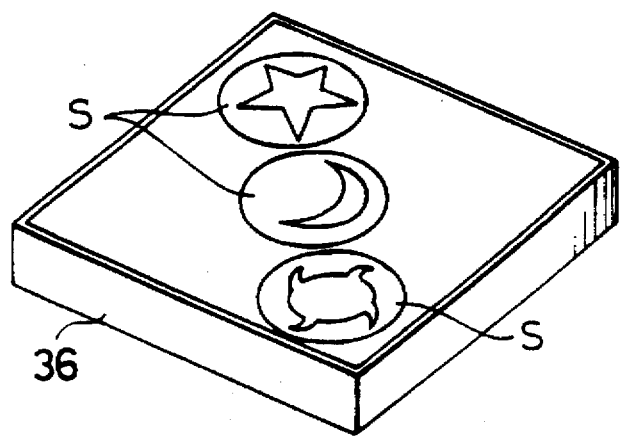
FIG. 20 is a perspective view of a second example of a shaped article produced by the invention.

For using the molding apparatus according to the first embodiment to produce the shaped article shown in FIG. 20, first, for example, the peripheral frame 2 shown in FIG. 4 having the star-shaped partition member 1, is attached to the cover 3 and the so-constituted form M is then placed open side down on the floor (base surface) of the frame 36, whereafter the gates are opened to supply yellow particles to the pattern space 4A and white particles to the pattern space 4B. The form M is then removed from the base surface, leaving thereon a shaped article with a yellow star against a white background. Next, the partition member is replaced first with the moon-shaped one and then with the sun-shaped one and the aforesaid operations are repeated to obtain on the base surface a shaped article with a yellow moon against a white background and a shaped article with a red sun against white background. It then suffices to supply the remaining portions of the base surface with white particles manually or by some other method. For example, if the supply of particles to the remaining areas is conducted using the apparatus shown in FIG. 1 without modification, the gates 6' of the supply pipe 6A for supplying red or yellow particles is closed and only white particles are supplied to the remaining space in the frame. A backing layer is overlaid, if necessary, and the particles are allowed to set.

Any mark left by removal of the partition member is cleanly eliminated by cave-in of the particles. The shaped article can also be formed by the method of placing a partition member and peripheral frame connected as a single unit on the base surface in advance, tightly attaching a cover carried on the XY frame to the partition member and the peripheral frame, supplying particles to the pattern spaces 4A and 4B, separately removing the partition member and peripheral frame using magnetic force or the like, and than allowing the particles to set. In this case, since the sun-shaped partition member is discontinuous, it is possible to produce a sun with flares by feeding red particles to the pattern space 4A first so as to allow them to blow out from the discontinuous portions. Since star- and moon-shaped partition members are continuous, the particles can be supplied first to either the pattern space 4A or the pattern space 4B.

For using the molding apparatus according to the second embodiment to produce the shaped article shown in FIG. 20, the apparatus of FIG. 13 is operated using star-, moon- and sun-shaped partition members 1 of the type shown in FIG. 4. Since the line mixer 28 of the apparatus according to FIG. 13 is able to blend colors continuously, it is possible to impart subtle variations to each of the star, moon and sun patterns. When a molding apparatus such as this having suction ports is used to produce shaped articles without use of suction, the suction ports can be opened for cleaning the filters.

In any of the foregoing cases, it is possible to use the press plate below a double action press as the base surface and, after one or more patterned shaped articles have been formed on the press plate, to press them into solid masses with the press. In addition, it is possible first to cause a plurality of patterned shaped articles to set as one large one and later cut them into individual articles.

Figure 21:
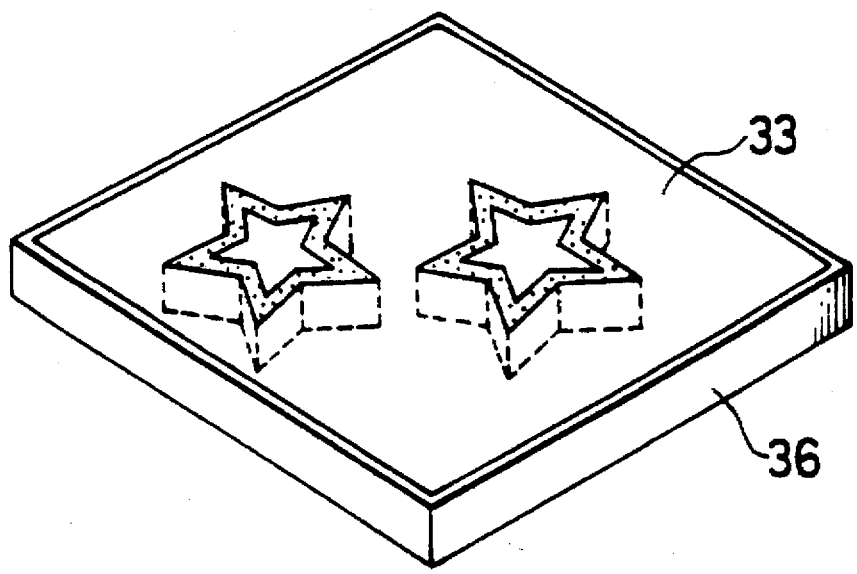
FIG. 21 is a perspective view of a third example of a shaped article produced by the invention.

For using the molding apparatus according to the second embodiment to produce ribs patterned shaped article shown in FIG. 21, a particle course 33 is formed on the floor (base surface) of the frame 36 beforehand and the form M shown in FIGS. 9 and 10 is pressed into the particle course with the gate 19' of the suction port 19B open so that the particles entering the pattern space 4B between the peripheral frame and the partition member are sucked out by the aspirator 20 as the form progresses into the course. When the form has come in contact with the floor, the gate 19' is closed and the gate 6' is opened, whereby particles of a different color are supplied from the particle tank 8B through the supply pipe 6B to charge the pattern space 4B with particles. The gate 6' is then closed and the form is removed from the particle course 33.

Figure 22:
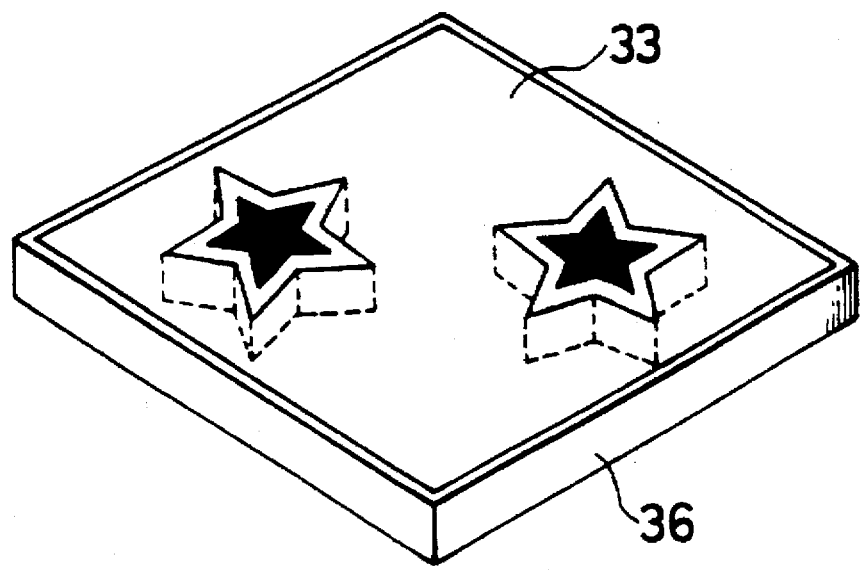
FIG. 22 is a perspective view of a fourth example of a shaped article produced by the invention.

Similarly, the patterned shaped article of FIG. 22 can be produced by pressing the form M of FIGS. 9 and 10 into the particle course with the gates of both the suction ports 19A and 19B open so that the particles entering the pattern spaces 4A and 4B are sucked out by the aspirator 20 as the form progresses into the course. The gates 6' of both supply pipes 6A and 6B are then opened, whereby particles of different colors are supplied from the particle tanks 8A and 8B to charge the pattern spaces 4A and 4B.

Figure 23:
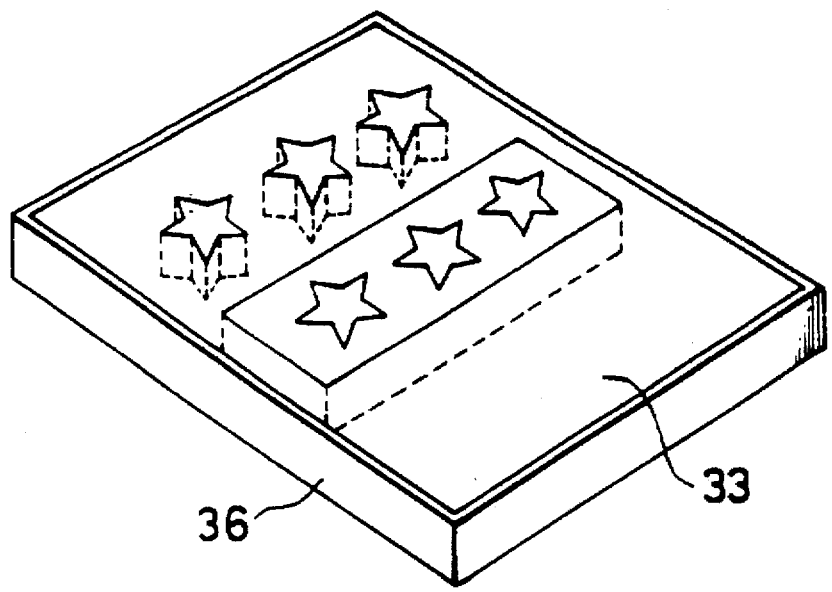
FIG. 23 is a perspective view of a fifth example of a shaped article produced by the invention.

The patterned shaped article of FIG. 23 can be produced by pressing the form M of FIGS. 11 and 12 into a particle course 33 formed beforehand on the floor (base surface) of the frame 36 and as the form progresses into the course sucking out only the particles entering the pattern space 4A inside each of the three star-shaped partition members and supplying particles of a different color to charge the pattern spaces 4A, or, alternatively, also simultaneously sucking out the particles entering the outer pattern spaces 4B and then also supplying particles of a different color to charge the pattern spaces 4B.

Figure 24:
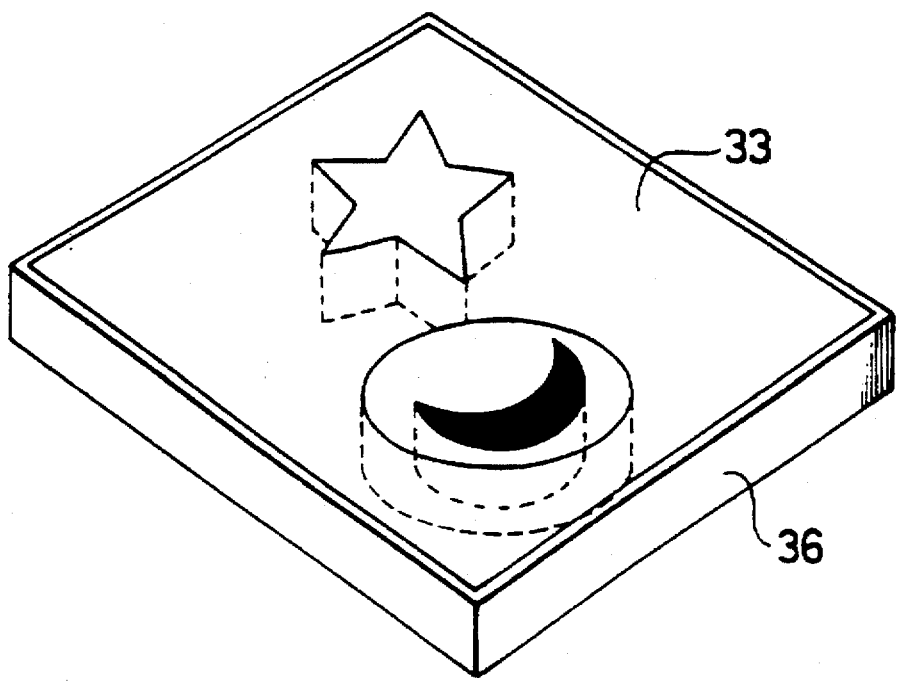
FIG. 24 is a perspective view of a sixth example of a shaped article produced by the invention.

The patterned shaped article of FIG. 24 can be produced by pressing the form M-I of FIG. 13 into a particle course 33 formed beforehand on the floor (base surface) of the frame 36 and as the form progresses into the course sucking out the particles entering the pattern space 4A inside star-shaped partition member with the aspirator 20 via the suction pipe 26 (without sucking out the particles entering the pattern space 4B) and supplying particles of a different color to charge the pattern space 4A, thereafter pressing the form M-II into the particle course 33 and as the form progress into the course using the aspirator to suck out the particles entering the pattern spaces 4A and 4B and then filling the two pattern spaces with different color particles.

A shaped article with a scene pattern like that shown in FIG. 8 can be produced by pressing the form shown in FIGS. 14 and 15 into a particle course 33 formed beforehand on the floor (base surface) of the frame 36 and, with the gate 19' open, sucking out particles entering the pattern spaces 4A-4D with the aspirator 20 as the form progress into the course, opening the supply gates when the lower edge of the form contacts the base surface so as to allow the compressed air to supply particles into the pattern spaces, closing the supply gates, and removing the form to leave the desired pattern in the remaining particle course 33 (see FIG. 15).

Figure 25:
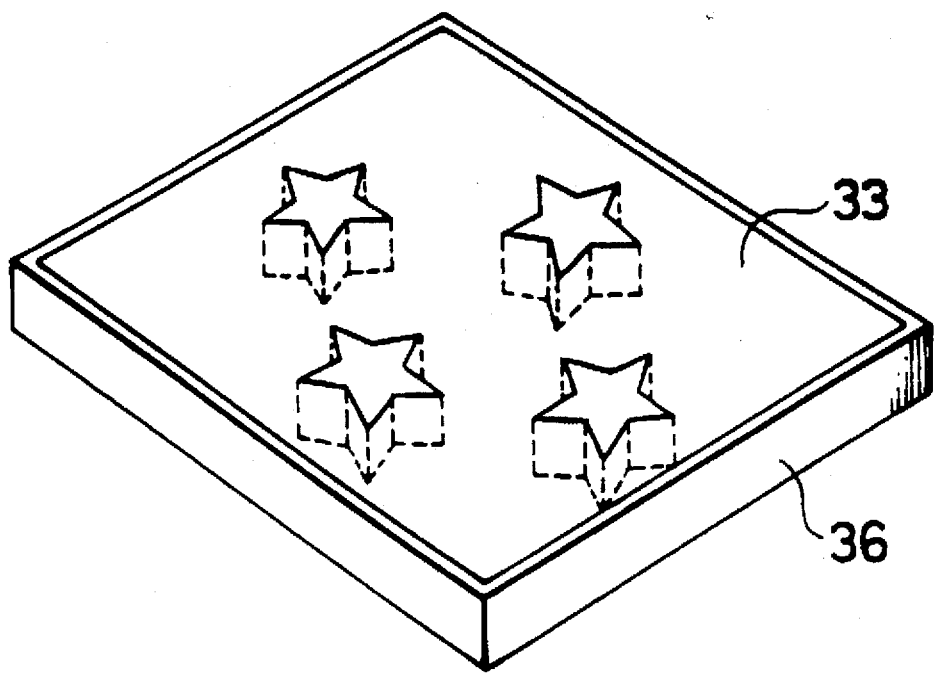
FIG. 25 is a perspective view of a seventh example of a shaped article produced by the invention.

For using the molding apparatus according to the third embodiment to produce the shaped article shown in FIG. 25, the form of the apparatus of FIG. 16 is placed open side down at the desired location on a white particle course provided in the frame beforehand, the form is pressed into the particle course with the manually operated suction port gate 19' open, and the gate 19' is closed and the manually operated feed port gate 8' opened when the partition member has reached the base surface and the pattern space been emptied, thereby supplying yellow particles to the pattern space. The feed port is then closed and the form removed to leave on the base surface a shaped article formed of a yellow particle course of prescribed thickness and embedded within a background of white particles. The pattern formation is completed when these operations have been repeated four times. A backing layer is then overlaid, if necessary, and the particles are allowed to set. Any mark left by removal of the partition member is cleanly eliminated by cave-in of the particles. In the case just described or when feed is conducted with low-pressure air, the particles can be sucked out of the pattern space to an intermediate depth of the existing particle course and a pattern can then be formed by supplying particles to the emptied space. For using the molding apparatus of FIG. 17 to produce the shaped article shown in FIG. 25, the star-shaped partition member is used and the pattern is produced in a course of white particles formed in a frame beforehand by moving the XY table and raising and lowering the form. In the case of the apparatus of FIG. 17, it is also possible to place the partition member on the base surface beforehand.

Figure 26:
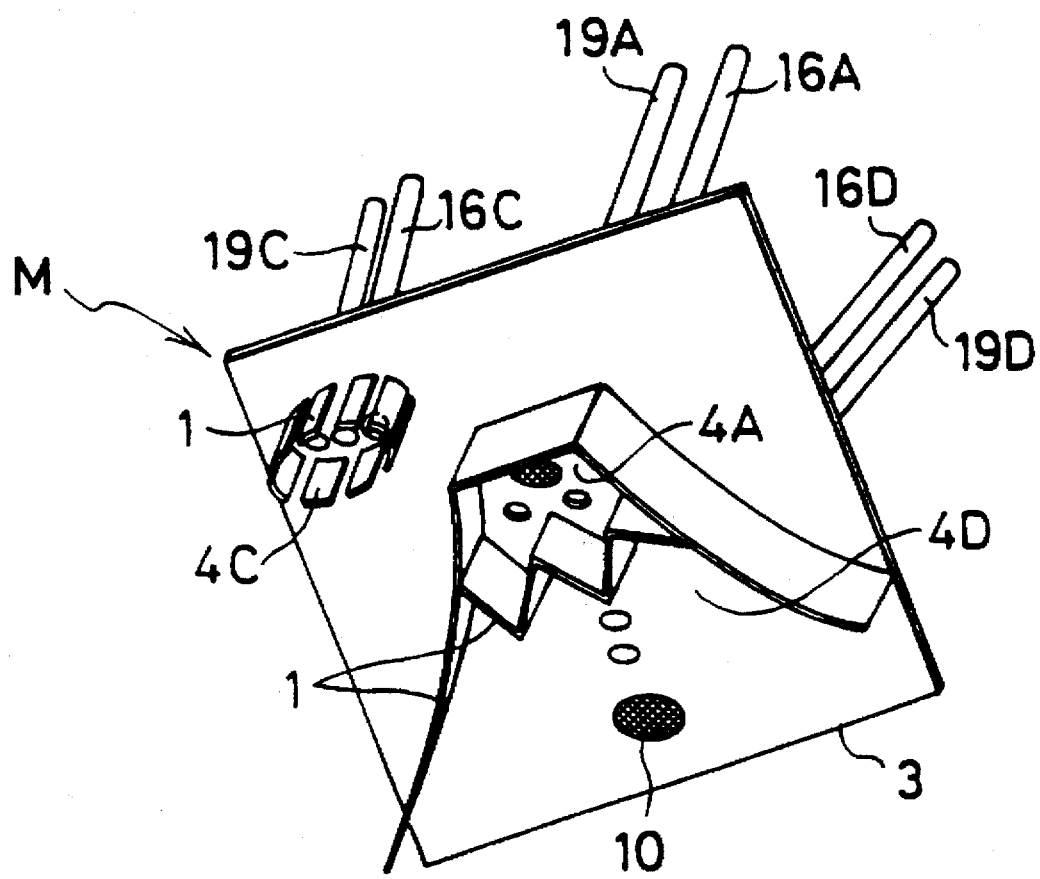
FIG. 26 is a perspective view showing another example of a form for use in the molding apparatus of FIG. 14.

FIG. 26 shows a form M used for producing a scene pattern with the molding apparatus according to the third embodiment. It differs from the form M of FIG. 15 in that the pattern space 4B for the sky is not provided with a feed port or a suction port. The configuration of the overall apparatus can therefore be what is obtained by removing from the apparatus of FIG. 14 the supply pipe and the suction pipe associated with the pattern space 4B, as well as the particle tank connected with the same supply pipe. While this apparatus can also be used with a peripheral frame closed at the bottom, the case in which it is used in an arrangement where the upper surface of a conveyor serves as the base surface will now be described.

A peripheral frame 36 is separately disposed on a conveyor and its interior is charged with particles to form a particle course 33. The robot is operated for placing the cover 3 directly on top of the peripheral frame and the partition member 1 attached to the underside of the cover is pressed into the particle course 33 with the suction gate 19' open. As the partition member 1 advances, the particles entering the pattern spaces 4A, 4B, 4C and 4D are sucked out by the aspirator 20. When the lower edge of the partition member 1 has contacted the base surface, the gate 19' is closed and the supply gates 6' and 8' are opened to allow the compressed air to charge the pattern spaces 4A, 4B, 4C and 4D evenly and completely with particles. The supply gates are then closed and the unit is removed from the base surface, thus forming a scene pattern in the particle course 33 of prescribed thickness remaining on the base surface. In other words, the pattern portions corresponding to the pattern spaces 4A, 4C and 4D are formed by particles supplied from the particle tanks 8A, 8C and 8D, while the pattern corresponding to the pattern space 4B is formed by particles that were a part of the particle course 33 from the beginning.

The shaped articles described in the foregoing are set either as formed or after being overlaid with a baking course. In the case where the shaped article is produced by the method of first sucking out and then supplying particles, it is preferable to use a base material as the material for the course formed on the base surface beforehand and then reuse the sucked out base material as pattern material after it has been added with a coloring material such as a pigment, colorant, metal or other mineral substance or with any of various powders or granules of, for example, rock or ceramic. The advantage of this is that it enables subtle differences in color to be produced continuously and, further, means that the only material with which the apparatus has to be supplied in advance is coloring material.

In all cases, the molding apparatus and method used for producing the pattern can be freely selected. By combining different apparatuses with various pattern forming methods it is possible to produce shaped articles with various patterns in addition to those described in the foregoing. Moreover, even where a shaped article with one and the same pattern is to be produced, it can be produced in various different ways so that there is considerable choice in the selection of the molding apparatus and the method of pattern formation. In any event, it is always possible to produce a well-defined pattern by controlling the amount of particles supplied and, if suction is used in parallel, by also controlling the amount of suction. As the material for the base surface it is preferable to use rubber, sponge, paper, unwoven fabric or other somewhat bulky or elastic material. This is because when the form of the molding apparatus is pressed onto a base surface formed of such a material the bulk or elasticity of the material enables absorption of the play between the base surface and the partition member and peripheral frame, which in turn makes it easier to position the form in the vertical direction. Moreover, since the partition member is able to define the pattern spaces more distinctly, it becomes possible to form sharper pattern lines. A similar effect can also be obtained by depressing the form with a spring or an elastic body made of rubber or the like or by attaching thread, string or other such elastic material to the contacting surfaces of the partition member. In all embodiments, each of the vents is preferably provided with a filter which can be made of unwoven fabric, woven fabric, paper, etc. The check valve regulates the flow of air in the operation of suction and exhaust and preferably serves to enable smooth exhaust and enhance the coefficient of removal of the particles by suction. In all embodiments, it is preferable to use particles obtained by adding a coloring agent such as a pigment or colorant to a base material so that colorful patterns can be produced by continuous color blending. As in dyeing, it is preferable to proceed from lighter to darker colors since this reduces the effect from the mixing of coloring materials. In all configurations, it is preferable to impart vibration to the form because doing so enables more even feeding of the particles and, by promoting particle cave-in at the regions from which the partition member is extracted, makes it possible to form highly compacted shaped articles.

In the method of the present invention, dry particle material is used for forming the pattern course on the base surface. Although after being dried the material may have absorbed one or more of water, oil, lubricant-bonding agent, solvent, setting agent or plasticizer, it is not kneaded with water, oil, lubricant-bonding agent, solvent, setting agent or plasticizer and is in a dry state readily amenable to pulverization for supply to the base surface. On the other hand, the material of which the backing layer is formed may be either dry or wet with one or more of water, oil, lubricant-bonding agent, solvent, setting agent and plasticizer. Otherwise, a plate of metal, wood, cement, glass or ceramic or a sheet of paper, unwoven fabric, woven fabric, knit fabric or plastic may be used as the backing layer. In this case, the plate or sheet serves as the base surface. In addition, any other existing shaped article may be used as a base surface to be formed with a pattern course that is set together therewith.

The materials to be supplied may differ from one another depending on the shaped article to be produced. Otherwise, in the finished state they are required to differ from one another in color, luster texture and the like.

In producing a concrete shaped article, the pattern course material is dry and consists mainly of cement powder, resin or a mixture thereof and may additionally include at least one of a pigment and fine aggregates, The material for a backing layer consists mainly of cement powder, resin or a mixture of cement powder and resin, the mixture further containing a fine aggregate and, if necessary, additionally containing a pigment and at least one of coarse aggregates and various kinds of fibers. The backing material may either be dry like the pattern material or in the form of a concrete slurry obtained by kneading with water etc.

Both the materials for the pattern course and the material for the backing layer may additionally include wood chips as aggregates or fine aggregates and may further include as blended therewith crushed or pulverized granite, crushed or pulverized marble, slag, light-reflecting particles, inorganic hollow bodies such as Shirasu balloons, particles of ceramics, new ceramics, metal, ore or other substances. They may also contain as additives a congealing and curing promoter, a waterproofing agent, an inflating agent and the like. The aforementioned various kinds of usable fibers include metal fibers, carbon fibers, synthetic fibers, glass fibers and the like.

All the materials are supplied to a form and are allowed to set into an integral mass. Otherwise after the material has been supplied, water is supplied to all portions of the Anterior of the form, thereby getting the materials into an integral mass within the form. If a wet material is used for the backing layer, the amount of water supplied is reduced in view of the water contained in the wet material when a plate of metal, wood, cement, glass or ceramic or a sheet of paper, unwoven fabric, woven fabric or knit fabric is used as the backing layer, for example, it can be allowed to set integrally with the pattern course. An asphaltic concrete shaped article can be produced using a thermal fusion material such as asphalt.

In producing an artificial stone shaped article, the materials for the pattern course and the material for the backing layer may, for example, be constituted of one or more of rock particles, ceramic particles, new ceramic particles, grass particles, plastic particles, wood chips or metal particles and may, as found necessary, further have mixed therewith a pigment and/or a setting agent for bonding the mixture. The setting agent is mainly a mixture of cement powder and water, a mixture of cement powder, resin and water, or a mixture of resin, water and a solvent and may further contain particles of one or more of rock, ceramic, new ceramic, glass and plastic and may, as found necessary, be kneaded with a pigment or colorant and have mixed therewith various kinds of particles, various kinds of fibers, various kinds of mixing agents and various kinds of additives. The various kinds of particles include particles of slag, fly ash and fine light-reflecting substances. The various kinds of fibers include metal fibers, carbon fibers, synthetic fibers and glass fibers. The various kinds of mixing agents and additives include shrink proofing agents, congealing and setting agents, delaying agents, waterproofing agents, inflating agents, water reducing agents, fluidizing agents and the like.

If necessary for enhancing the adherence of the setting material with the aforementioned materials, the materials can be sprayed with or immersed in water, solvent or surface treatment agent.

All the materials can be set into an integral mass within a form etc. by vacuum-suction treatment, centrifugal treatment or other such treatment for spreading the setting agent between adjacent particles or by using a mixture of an aggregate and a setting agent as the material for the backing layer. When a plate of metal, wood, cement, glass or ceramic or a sheet of paper unwoven fabric, knit fabric, woven fabric or plastic is used as the backing layer, the pattern course can be allowed to set integrally therewith.

For producing a ceramic shaped article or the raw product for a ceramic shaped article, the dry materials for the pattern course are mainly particles of one or more of clay, rock, glass, new ceramic, fine ceramic and glaze with or without a pigment or colorant added thereto. The materials may be ones which have absorbed some water or been added with a lubricant-bonding agent after drying but they are not kneaded with the lubricant-bonding agent or water and are in a state readily amenable to pulverization. The material for the backing layer is constituted mainly of particles of one or more of clay, rock, glass, new ceramic and fine ceramic and may additionally contain a pigment and a colorant. In the finished state, the backing layer is required to differ from the pattern course in color, luster, texture and the like and may be either dry, similarly to the pattern course, or made wet by kneading with water or a lubricant-bonding agent. In addition, either the materials for the pattern course or the material for the backing layer may have further mixed therewith inorganic hollow bodies such as shirasu balloons, and particles of ceramic, metal or ore and may have added thereto various kinds of foaming agents, fluidization-preventing agents, supernatant agents, lubricating agents, bonding agents and adherence promoters as additives.

The materials supplied into a form etc. are allowed or caused to set into an integral mass without adding or by adding a predetermined amount of water or lubricant-bonding agent to plasticize them and applying pressure to the resultant mixture. The set integral mass is removed from the form etc. and used as a raw product. The raw product is sintered to obtain a ceramic shaped article. Otherwise, the materials supplied into a refractory setter or similar form are melted or fused by heating to obtain an integral mass, and the integral mass is removed from the setter. In the case of a shaped article of enamel, stained glass or crystalline glass the material for the pattern course is laid on a plate of metal, glass or ceramic and melted or fused by heating to be made integral with the plate.

The dry materials for the pattern course used in producing a shaped article having an impasto layer are various kinds of powdered paint, and the material for the backing layer is a plate or the like of metal, wood, cement or ceramic. The various kinds of powdered paint include acrylic resin, polyester resin, acrylic-polyester hybrid resin, fluorine resin and similar resins having a pigment or colorant added thereto. The materials for the pattern course are laid on the plate as a backing layer and melted and fused by heating to unite the two layers together. In uniting the two layers together, pressure may be applied to the layers. As a result, it is possible to obtain a plate having an impasto layer thereon.

In producing a plastic shaped article, the dry materials for the pattern course are constituted mainly of particles of various kinds of plastics and may additionally contain a pigment or a colorant. The materials may also contain a plasticizer or solvent, but are not kneaded with a plasticizer or solvent and are in a state readily amenable to pulverization. The material for the backing layer may be either dry or made wet by kneading with a plasticizer or solvent. The various kinds of plastics include polyethylene, nylon, polypropylene, polycarbonate, acetal, polystyrene, epoxy, vinyl chloride, natural rubber, synthetic rubber, acrylonitrile-butadiene-styrene, polypropylene oxide, ethylene-vinyl acetate copolymer, fluorine resin and other thermoplastics and thermosetting resins. Both the materials for the pattern course and the material for the backing layer may, as found necessary, contain a foaming agent, oxidization preventing agent, thermal stabilizer, bridging agent, other additives and particles of inorganic materials and the like. All the materials are melted or fused into an integral mass by heating, while applying pressure thereto, if necessary. With this method, it is possible to produce a patterned shaped article of foamed styrol, a patterned shaped bathtub or floor tiles of plastic, etc. In this case, the two layers may be united with a plate of metal, wood, cement, ceramic or a sheet of paper, unwoven fabric, knit fabric, woven fabric or plastic.

In producing confectionery or other shaped foodstuffs, the dry materials for the pattern course are constituted mainly of particles of one or more of wheat, rice, potato, bean, corn and sugar and may additionally contain seasonings and spices. The materials may also contain oil or water, but are not headed with oil or water and are in a state readily amenable to pulverization. The material for the backing layer may be either dry, similarly to the materials for the pattern course, or made wet by kneading with oil or water. Both the materials for the pattern course and the material for the backing layer may, as found necessary, further contain an inflating agent and other additives. All the materials are supplied into a form etc. and are allowed to set or caused to set by adding water of oil to plasticize them into an integral mass. The integral mass is pressed and then removed from the form to obtain a raw product. The raw product is then baked. Otherwise, all the materials are baked within the form etc. With this method, it is possible to produce various patterned baked confectioneries. It is also possible to produce a patterned shaped article melted by heating, such as a patterned chocolate shaped article etc., by using particles of the material melted by heating, such as chocolate etc., and melting and fusing the particles by heating.

The materials that can be used in the present invention are not limited to those set out as examples herein and various other materials can also be used depending on the shaped article to be produced. Moreover, the range of patterned shaped articles that can be produced can be increased by combining various materials that, in the finished state, differ in property, color, luster, texture and the like. For instance, by using foundry sand or metal powder as the material it is possible to produce a mold or a patterned sintered metal shaped article.

In the method for producing any of the patterned shaped articles, it is desirable to apply vibration when the materials are supplied onto the base surface so as to ensure smooth movement of the materials. Further, by rubbing with a brush or comb or applying a jet of air or water to the boundary portion between the different kinds of materials for the pattern course, the pattern can be blurred.

In addition, by providing on the base surface or pattern course a mat of unwoven fabric or other water or oil absorbing material, any excess amount of water, oil, lubricant-bonding agent, plasticizer or solvent can be supplied to any portion deficient in them to uniformly disperse them in the shaped article. As a result, the ratio of the water (auxiliary agents) in the surface to the cement (resins) becomes small and this means that the strength of the shaped article as a whole is enhanced. When an air permeable mat is used in the formation of an article under pressure, degassing is enhance to obtain a dense article. By vibrating or pressing one or both of the pattern course and the backing layer when the two layers are being allowed to set into an integral article, the integral article obtained becomes dense and is improved in strength. The article may be reinforced with long fibers, short fibers, wire nets or reinforcing rods by inserting these in or between the two layers. The method of using an article obtained by the sheet making method or extrusion molding method or any of various plates or sheets as the backing layer is applicable to the production of various articles including architectural panels and boards, wall sheets and tiles. The surface of an existing concrete article can be used as the base surface. In this case, the materials for the pattern course are discharged onto the concrete surface and set to be integral with the existing concrete article.

In the method of producing a shaded article according to this invention, it is possible to produce a shaped article with a curved finished surface by using a deformable mat as the base surface or using a partially or generally deformable form.

For repeatedly producing a thick pattern, the conventional methods require use of a plurality of auxiliary forms for achieving rapid production and further require use of a mask or the like at the time of charging the materials into the form. On the other hand, the method of the present invention enables rapid production without use of a mask or the like. Moreover, since there is no need to fit together a plurality of auxiliary forms and partition members, it is possible to repeatedly produce various patterns to a high degree of perfection. In addition, since various shapes can be produced by interchanging forms, the invention is adaptable to production of both small and large area shaped articles. When compressed air is used, moreover, it is possible to reduce the size of the components required in the vicinity of the form for supplying the particles thereto. This makes it easy to incorporate the invention into an existing apparatus with tight space limitations. For example, a compressed patterned shaped article production machine can be easily realized by incorporating the invention into an existing double-action press or the like. Since the materials are supplied to the pattern space by compressed air, shaped articles can be produced almost instantaneously. In addition, the method of producing a shaped article by sucking out particles from a prescribed region of an existing particle layer and then supplying particles to the evacuated region enables speedy production since the existing layer of particles is used as part of the final product. Further, by adopting the method of adding a coloring material to the sucked up particles or to base particles supplied to the apparatus beforehand, it becomes easy to achieve continuous color change.

By these production methods, it is possible to easily produce concrete shaped articles, artificial stone shaped articles, raw products for sintering into ceramic shaped articles, patterned shaped ceramic article, impasto shaded articles, plastic shaped articles and shaped foodstuffs including confectionery each having a pattern of a prescribed thickness formed on part or all of the surface thereof. Therefore, the patterned shaped articles can maintain their patterns in excellent condition even when exposed to surface abrasion. Since the pattern layer is formed by a combination of various kinds of dry materials, the materials can, owing to their cave-in action, be densely charged without any gaps and the boundaries between adjacent materials can be minutely expressed. The pattern formed is thus very clear-cut.

In addition, it is also possible to positively disturb the charged particles either at the boundaries between them or as a whole after the particles have been charged. Doing this enables the production of shaped articles which resemble marble or other kinds of natural stone.

In the case of the production of either a raw product for a ceramic shaped article or a ceramic shaped article, it is possible to produce various kinds of elements, circuits, antennas, etc. with ease by combining at least two kinds of materials for an insulator, conductor, semiconductor, dielectric, piezoelectric device, magnetic substance, etc.

Furthermore, when the produced article is used as an architectural plate, since the plate maintains its pattern even after chamfering, cutting treatment can be effected without any restriction.

We claim:

1. A method of producing a pattern shaped article comprising the steps of placing on a base surface a form constituted of at least one partition member defining the boundary of the pattern to be produced, a peripheral frame surrounding the partition member at a prescribed spacing therefrom and a cover for closing the upper ends of the partition member and the peripheral frame, supplying dry particles to a pattern space enclosed by the partition member and a pattern space between the partition member and the peripheral frame, removing the form from the base surface, forming a particle course having a prescribed pattern, and causing the particles to set into an integral mass.

2. A method of producing a pattern shaped article comprising the steps of placing on a backing layer a form constituted of at least one partition member defining the boundary of the pattern to be produced, a peripheral frame surrounding the partition member at a prescribed spacing therefrom and a cover for closing the upper ends of the partition member and the peripheral frame, supplying dry particles to a pattern space enclosed by the partition member and a pattern space between the partition member and the peripheral frame, removing the form from the backing layer, forming a particle course having a prescribed pattern on the backing layer, and causing the particles to set into an integral mass with the backing layer.

3. A method of producing a pattern shaped article comprising the steps of placing on a base surface a form constituted of a partition member defining the boundary of the pattern to be produced and a cover for closing the upper end of the partition member, supplying dry particles to a pattern space enclosed by the partition member, removing the form from the base surface, forming a particle course having a prescribed pattern, and causing the particles to set into an integral mass.

4. A method of producing a pattern shaped article comprising the steps of placing on a backing layer a form constituted of a partition member defining the boundary of the pattern to be produced and a cover for closing the upper end of the partition member, supplying dry particles to a pattern space enclosed by the partition member, removing the form from the backing layer, forming a particle course having a prescribed pattern on the backing layer, and causing the particles to set into an integral mass with the backing layer.

5. A method of producing a pattern shaped article comprising the steps of pressing open side down into an existing particle layer provided on a base surface a form constituted of at least one partition member defining the boundary of the pattern to be produced, a peripheral frame surrounding the partition member at a prescribed spacing therefrom and a cover for closing the upper ends of the partition member and the peripheral frame, sucking existing particle layer particles from at least one of a pattern space enclosed by the partition member and a pattern space between the partition member and the peripheral frame, supplying at least one pattern space from which existing particle layer particles were sucked with particles different from those of the existing particle layer, removing the form from the existing particle layer, forming a particle course having a prescribed pattern in the existing particle layer, and causing the supplied particles and the existing particle layer to set into an integral mass.

6. A method of producing a pattern shaped article comprising the steps of pressing open side down into an existing particle layer provided on a base surface a form constituted of a partition member defining the boundary of the pattern to be produced and a cover for closing the upper end of the partition member, sucking existing particle layer particles from a pattern space enclosed by the partition member, supplying the pattern space from which existing particle layer particles were sucked with particles different from those of the existing particle layer, removing the form from the existing particle layer, forming a particle course having a prescribed pattern in the existing particle layer, and causing the supplied particles and the existing particle layer to set into an integral mass.

7. A method according to any of claims 1, 3, 5 or 6, wherein the particle course having a prescribed pattern is overlaid with a backing layer and caused to set into an integral mass therewith.

8. A method according to any of claims 1, 2, 3, 4, 5 or 6, wherein the particles are supplied to the pattern spaces by compressed air.

9. A method according to any of claims 5 or 6, wherein the sucked particles are colored and supplied to the pattern spaces.

10. A method according to any of claims 1, 3, 8 or 6, wherein the base surface is an air or liquid permeable mat.

11. A method according to any of claims 1, 3, 5 or 6, wherein the base surface is a liquid absorbing mat.

* * * * *